US012069514B2

(12) United States Patent
Akl et al.

(10) Patent No.: US 12,069,514 B2
(45) Date of Patent: Aug. 20, 2024

(54) MULTI-DONOR TOPOLOGICAL REDUNDANCY IN INTEGRATED ACCESS AND BACKHAUL

(71) Applicant: QUALCOMM Incorporated, San Diego, CA (US)

(72) Inventors: Naeem Akl, Somerville, NJ (US); Karl Georg Hampel, Jersey City, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 17/645,976

(22) Filed: Dec. 24, 2021

(65) Prior Publication Data

US 2022/0225166 A1 Jul. 14, 2022

Related U.S. Application Data

(60) Provisional application No. 63/137,700, filed on Jan. 14, 2021.

(51) Int. Cl.
*H04W 28/08* (2023.01)
*H04W 28/02* (2009.01)
*H04W 28/086* (2023.01)
*H04W 88/14* (2009.01)

(52) U.S. Cl.
CPC ... *H04W 28/0862* (2023.05); *H04W 28/0263* (2013.01); *H04W 28/0268* (2013.01); *H04W 88/14* (2013.01)

(58) Field of Classification Search
CPC ......... H04W 28/0862; H04W 28/0263; H04W 28/0268; H04W 88/14
See application file for complete search history.

(56) References Cited

U.S. PATENT DOCUMENTS

| 11,924,737 | B2 * | 3/2024 | Huang | H04W 8/08 |
| 11,950,124 | B2 * | 4/2024 | Chen | H04W 28/10 |
| 2019/0373627 | A1 * | 12/2019 | Luo | H04W 24/10 |
| 2021/0105622 | A1 * | 4/2021 | Rajadurai | H04W 8/26 |
| 2021/0176658 | A1 * | 6/2021 | Wang | H04B 7/155 |
| 2021/0329629 | A1 * | 10/2021 | Xu | H04W 72/542 |
| 2021/0392538 | A1 * | 12/2021 | Wang | H04B 7/15528 |

(Continued)

*Primary Examiner* — Bailor C Hsu
(74) *Attorney, Agent, or Firm* — Procopio, Cory, Hargreaves & Savitch LLP

(57) ABSTRACT

A method, a computer-readable medium, and an apparatus are provided. The apparatus may include a first IAB-donor-CU. The apparatus may receive a first request from a second IAB-donor-CU to route a first traffic between a first IAB node associated with the second IAB-donor-CU and a second IAB node associated with the first IAB-donor-CU. The apparatus may receive from the second IAB-donor-CU first QoS information for the first traffic. The apparatus may transmit a request to a third IAB-donor-CU to route a second traffic between a third IAB node associated with the first IAB-donor-CU and a fourth IAB node associated with the third IAB-donor-CU, where at least a part of content of the second traffic is based on the first traffic.

30 Claims, 24 Drawing Sheets

(56) References Cited

U.S. PATENT DOCUMENTS

2022/0078808 A1\* 3/2022 Luo .................. H04W 72/1221
2022/0131806 A1\* 4/2022 Akl ........................ H04W 8/04
2022/0225129 A1\* 7/2022 Chen ..................... H04W 24/04

\* cited by examiner

MULTI-DONOR TOPOLOGICAL REDUNDANCY IN INTEGRATED ACCESS AND BACKHAUL

CROSS REFERENCE TO RELATED APPLICATION(S)

This application claims the benefit of and priority to U.S. Provisional Application Ser. No. 63/137,700, entitled "Multi-Donor Topological Redundancy in Integrated Access and Backhaul" and filed on Jan. 14, 2021, which is expressly incorporated by reference herein in its entirety.

TECHNICAL FIELD

The present disclosure relates generally to communication systems, and more particularly, to wireless communication in an integrated access and backhaul (IAB) network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a first IAB-donor-central unit (IAB-donor-CU). The apparatus may receive a first request from a second IAB-donor-CU to route a first traffic between a first IAB node associated with the second IAB-donor-CU and a second IAB node associated with the first IAB-donor-CU. The apparatus may receive from the second IAB-donor-CU first quality of service (QoS) information for the first traffic. The apparatus may transmit a request to a third IAB-donor-CU to route a second traffic between a third IAB node associated with the first IAB-donor-CU and a fourth IAB node associated with the third IAB-donor-CU, where at least a part of content of the second traffic is based on the first traffic.

In an aspect of the disclosure, a method, a computer-readable medium, and an apparatus are provided. The apparatus may include a second IAB-donor-CU. The apparatus may transmit a first request to the first IAB-donor-CU to route a first traffic between a first IAB node associated with the second IAB-donor-CU and a second IAB node associated with the first IAB-donor-CU, where the first request relates to routing second traffic between a third IAB node associated with the first IAB-donor-CU and a fourth IAB node associated with a third IAB-donor-CU, and where content of the second traffic is at least partially based on the first traffic. The apparatus may transmit to the first IAB-donor-CU first QoS information for the first traffic, where second QoS information for the second traffic is based at least in part on the first QoS information. The apparatus may receive, from the first IAB-donor-CU, an indication that at least part of the first traffic is rerouted via an IAB node associated with the third IAB-donor-CU.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
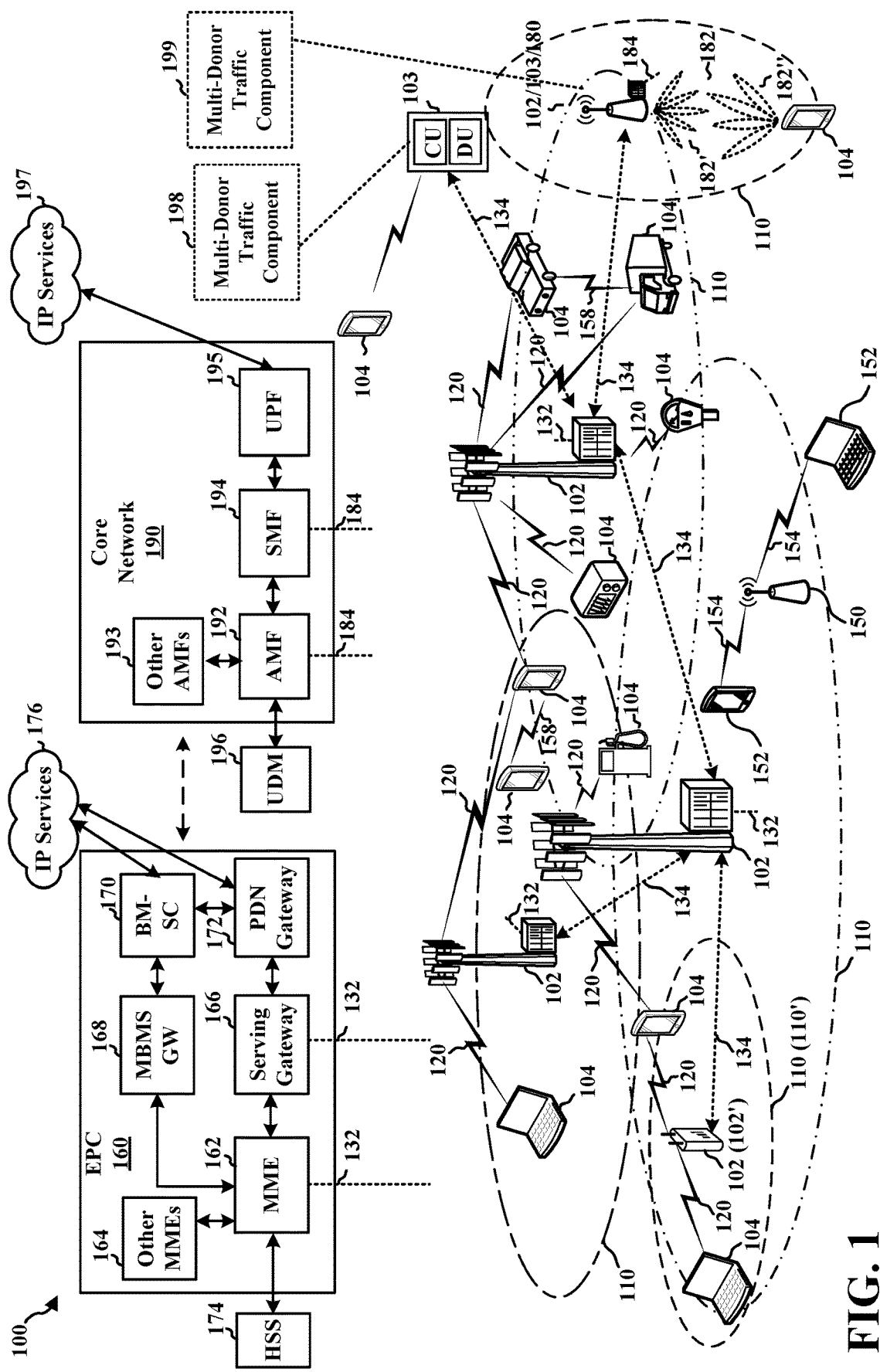
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user IP packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the first IAB-donor-CU in the first IAB-donor node (e.g., which may be the IAB node 103) may include a multi-donor traffic component 198 that is configured to receive a first request from a second IAB-donor-CU to route a first traffic between a first IAB node associated with the second IAB-donor-CU and a second IAB node associated with the first IAB-donor-CU; receive from the second IAB-donor-CU first QoS information for the first traffic; and transmit a request to a third IAB-donor-CU to route a second traffic between a third IAB node associated with the first IAB-donor-CU and a fourth IAB node associated with the third IAB-donor-CU, where at least a part of content of the second traffic is based on the first traffic. In certain aspects, the second IAB-donor-CU in the second IAB-donor node (e.g., which may be the IAB node 103) may include a multi-donor traffic component 199 that is configured to transmit a first request to the first IAB-donor-CU to route a first traffic between a first IAB node associated with the second IAB-donor-CU and a second IAB node associated with the first IAB-donor-CU, where the first request relates to routing second traffic between a third IAB node associated with the first IAB-donor-CU and a fourth IAB node associated with a third IAB-donor-CU, and where content of the second traffic is at least partially based on the first traffic; transmit to the first IAB-donor-CU first QoS information for the first traffic, where second QoS information for the second traffic is based at least in part on the first QoS information; and receive, from the first IAB-donor-CU, an indication that at least part of the first traffic is rerouted via an IAB node associated with the third IAB-donor-CU. Although the following description may be focused on 5G NR, the concepts described herein may be applicable to other similar areas, such as LTE, LTE-A, CDMA, GSM, and other wireless technologies.

Figure 2:
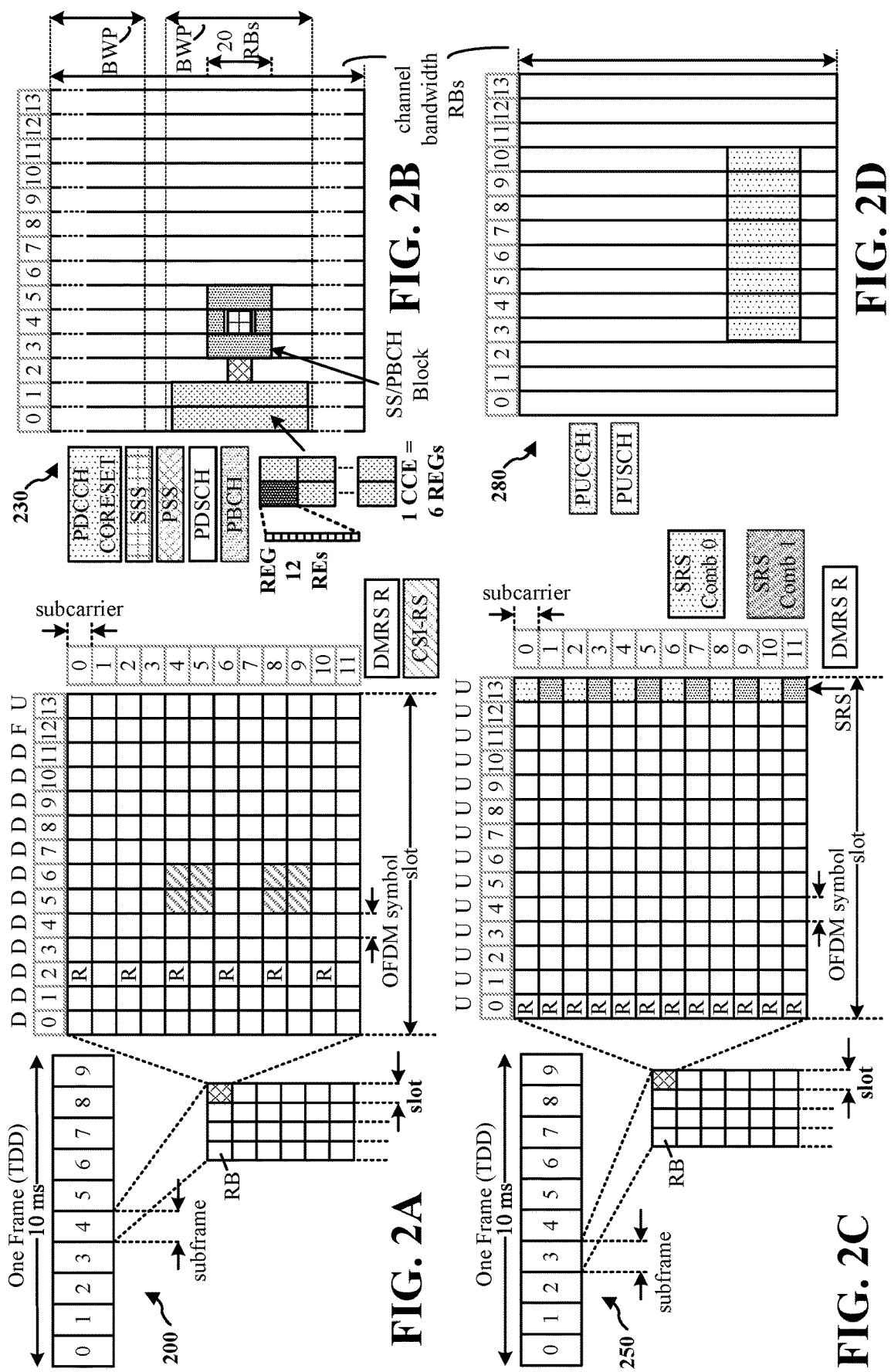
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
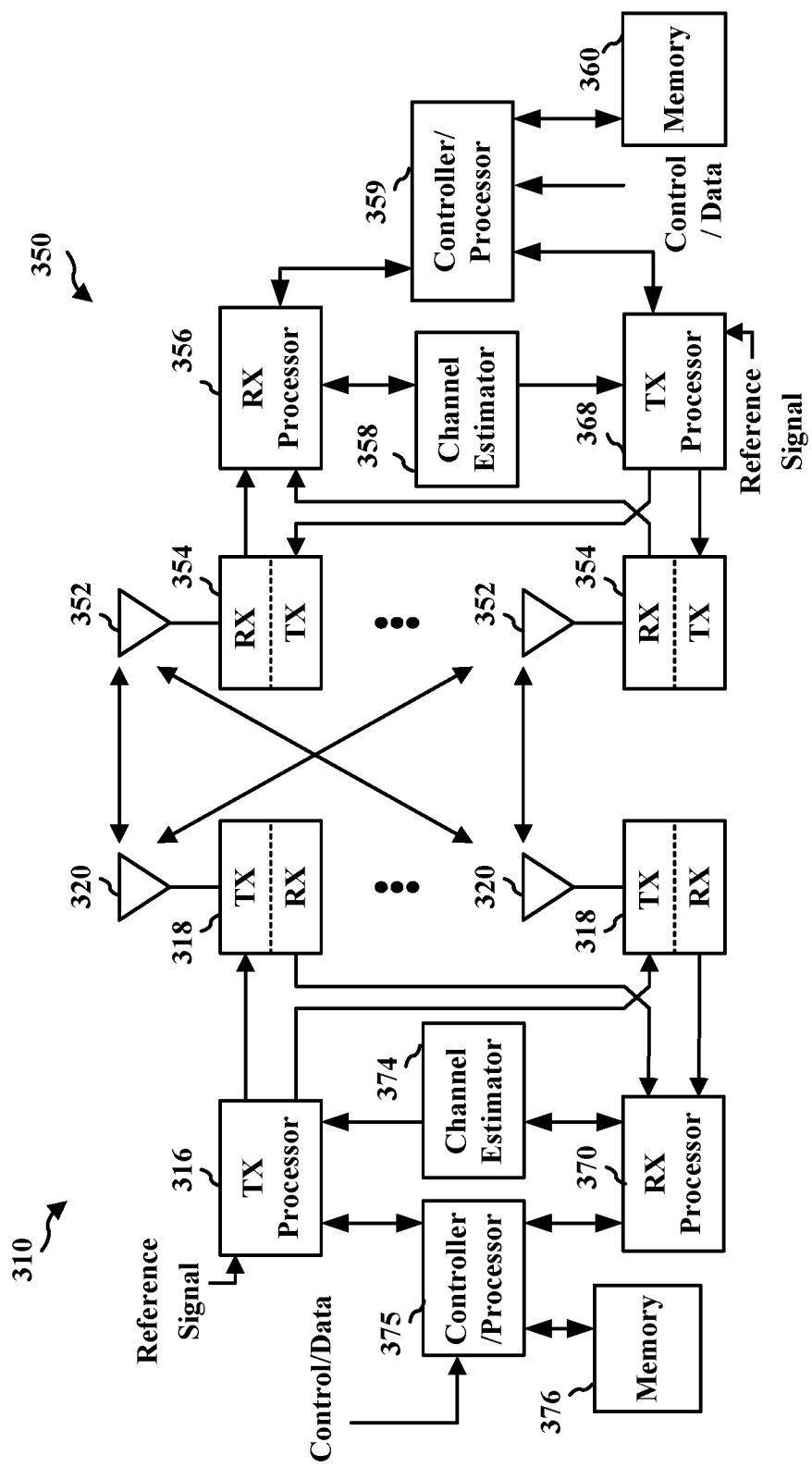
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes an RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 and 199 of FIG. 1.

Figure 4:
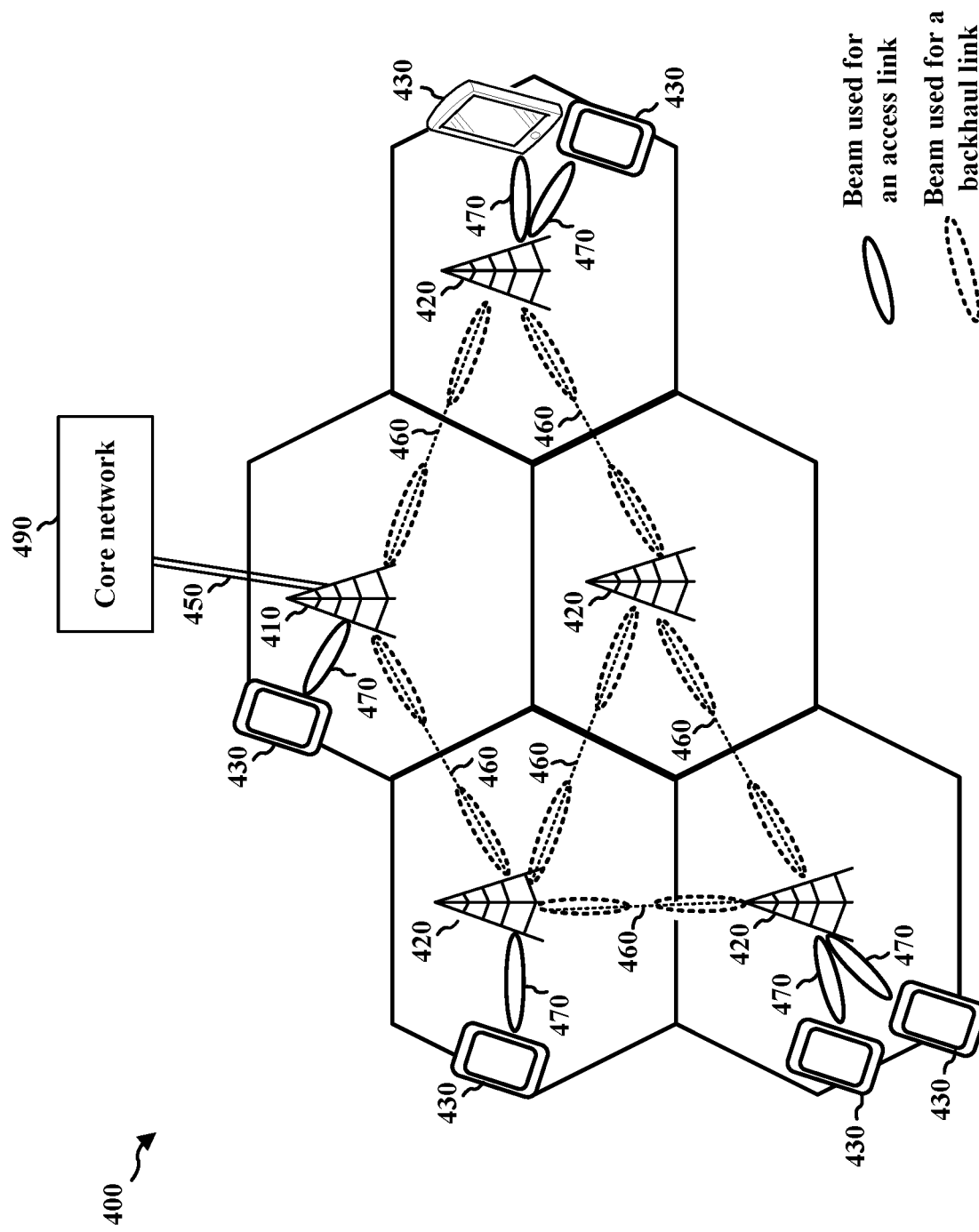
FIG. 4 is a diagram illustrating an example IAB network.

FIG. 4 is a diagram illustrating an IAB network 400. The IAB network provides access network functionality between access nodes (ANs) and other ANs/UEs, and backhaul network functionality between ANs. The ANs include IAB-donors, which have a wireline connection to the core network, and IAB-nodes, which operate wirelessly and relay traffic to/from IAB-donors through one or more AN hops. The IAB ANs share resources between the access and backhaul. That is, the resources used for access communication between the ANs and ANs/UEs are also used for backhaul communication between the ANs.

The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may include L2 relay nodes, etc. Together, the IAB donor 410 and the IAB nodes 420 share resources to provide an access network and a backhaul network to the core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. The UEs 430 communicate with the core network 490 by relaying messages through their respective access link 470 to the IAB network 400, which then may relay the message through backhaul links 460 to the IAB donor 410 to communicate with the core network 490 through the wireline backhaul link 450. Similarly, the core network 490 may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for the IAB donor 410 or the IAB node 420. The PCI value may be used to determine a scrambling sequence that may be applied to physical signals and/or channels that are transmitted by a particular IAB node. For example, a PSS and/or the SSS transmitted by the respective IAB donor 410 or IAB node 420 may be scrambled using a scrambling sequence that may be based on the PCI used by the respective IAB node.

Figure 5:
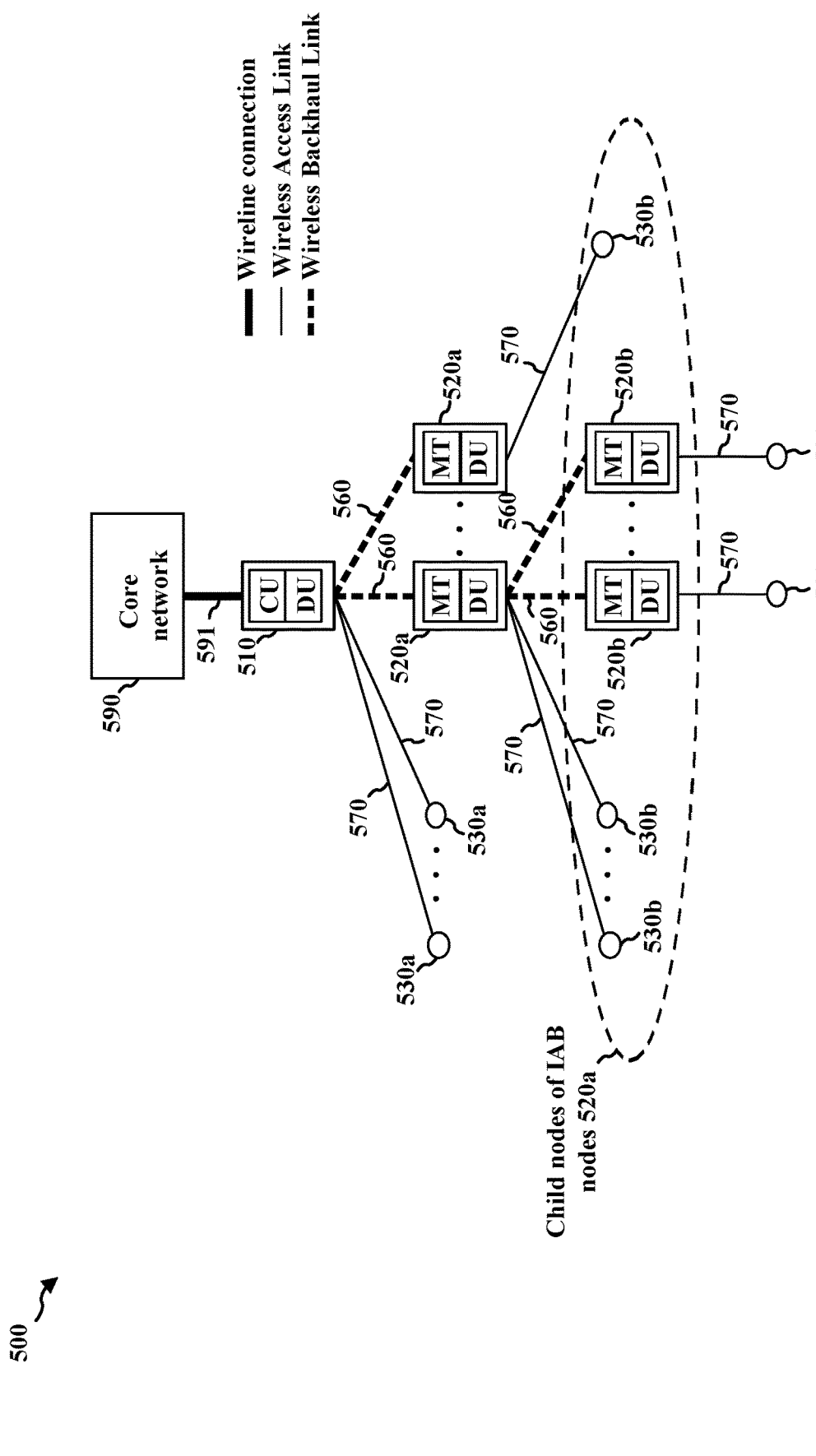
FIG. 5 is a diagram illustrating an example IAB network and components thereof.

FIG. 5 is a diagram illustrating an IAB network 500 and components thereof. The IAB network 500 includes an IAB donor 510 and IAB nodes 520a and 520b. The IAB nodes 520a-520b, as well as the IAB donor node 510, may provide wireless access links to UEs 530a-530c.

The IAB donor node 510 may be considered a root node of the tree structure of the IAB network 500. The IAB donor node 510 may be connected to the core network 590 via a wired connection 591. The wired connection may include, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor node 510. The IAB donor node 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The CU may provide control for the IAB nodes 520a, 520b in the IAB network 500. For example, the CU may control the IAB network 500 through configuration. The CU may perform RRC/PDCP layer functions. The IAB donor nodes 510 further include a DU that may perform scheduling. For example, the DU may schedule resources for communication by the child IAB nodes 520a and/or UEs 530a of the IAB donor 510. The DU holds RLC, media access control (MAC), a physical (PHY) layer functions. One IAB-donor-CU may be associated with multiple IAB-donor-DUs.

The IAB nodes 520a, 520b may include a mobile termination (MT) and a DU. The IAB node may be an L2 relay node. The MT of IAB node 520a may operate as a scheduled node that may be scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. An IAB node may provide a connection to an IAB node that in turn provides another connection for another IAB node. The pattern of a parent IAB node including a DU that schedules a child IAB node/child UE may continue to more connections than illustrated in FIG. 5.

Figure 6:
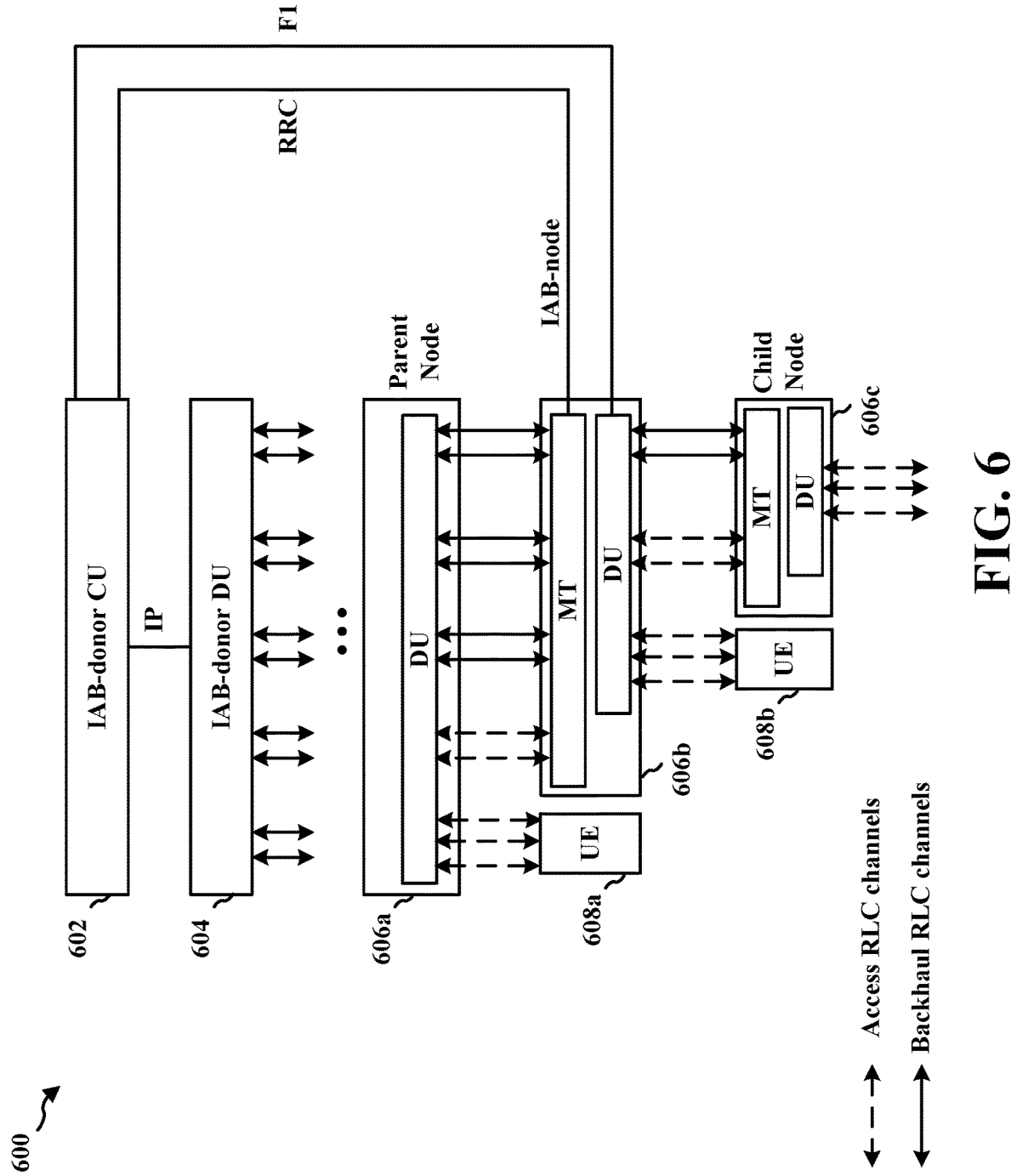
FIG. 6 is a diagram illustrating example connections for an IAB network.

FIG. 6 is a diagram 600 illustrating RLC channels in an IAB network. As discussed supra, the IAB network provides both access network functionality and backhaul network functionality. The IAB network includes an IAB donor with a CU 602 and DU 604. In order to provide access network functionality, IAB nodes 606a, 606b, and 606c may communicate with other UEs 608a and 608b and/or MTs of other IAB ANs through access RLC channels. Thus, the IAB nodes 606a, 606b, and 606c operate as access IAB nodes for their child nodes or UEs. In order to provide backhaul network functionality, IAB nodes 606a, 606b, and 606c may route traffic to other IAB nodes (e.g., 606a, 606b, and 606c) through backhaul RLC channels (BH RLC CHs). Thus, the IAB nodes 606a, 606b, and 606c may operate as an intermediate IAB node when backhauling traffic for other IAB nodes. Access RLC channels include UE-to-DU/DU-to-UE, carrying PDCP for RRC or data radio bearers (DRBs), and MT-to-DU/DU-to-MT, carrying PDCP for RRC (or DRBs). Backhaul RLC channels include MT-to-DU/DU-to-MT, carrying backhaul adaptation protocol (BAP) messages for backhauling access traffic.

Figure 7:
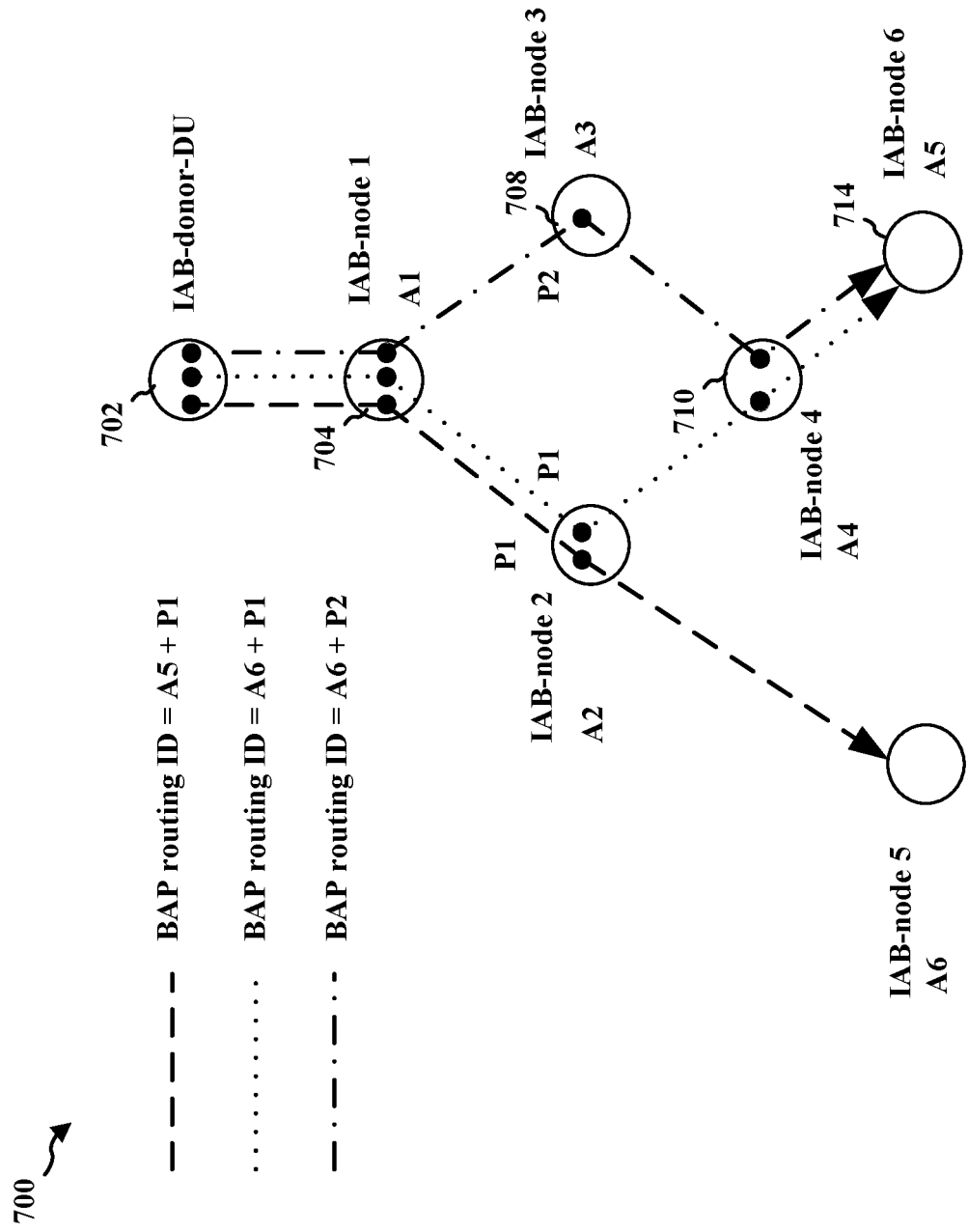
FIG. 7 is a diagram illustrating an example BAP layer for an IAB network.

FIG. 7 is a diagram illustrating example aspects of a BAP layer 700 for an IAB network. The BAP layer may provide both a routing function and a QoS support function for traffic in the IAB network. A packet may be routed through the IAB network from a source to a destination. For downlink traffic, the source may be an IAB-donor-DU (e.g., IAB-donor-DU 702), and the destination may be one of the ANs. It should be appreciated that one IAB node function as either an intermediate node or an AN with respect to different UEs. If an IAB node routes traffic for a UE, but does not directly communicate with the UE over the air interface, the IAB node may be referred to as an intermediate node with respect to the UE. The same IAB node may be an AN, e.g., providing an access RLC channel, with respect to a different UE. For uplink traffic, the source may be an AN, and the destination may be an IAB-donor-DU. The BAP layer may support routing across a wireless backhaul and mapping of traffic to backhaul RLC channels (e.g., for QoS).

The routing function may be implemented at both the endpoints of the route as well as at the intermediate nodes. A BAP header of a packet may carry a BAP routing identifier (ID), which may further include a BAP address and a BAP path ID. The BAP address may be a destination address associated with a node in the network. For example, for the downlink traffic in FIG. 7, the BAP address may be the address for the IAB-node 6 714, i.e., A6, if the destination of the traffic is the IAB-node 6 714 or IAB-node 5 if the destination of the traffic is IAB node 5. For uplink traffic, the BAP address may be the address for the IAB-donor-DU 702, as the IAB-donor-DU may be the destination of the traffic. For downlink traffic, when the IAB-donor-DU 702 sends a packet to a destination node through the IAB network, each node along the path may check the BAP address in the header of the packet, and determine whether the packet is destined for itself or for some other node based on the BAP address.

Multiple paths may exist in the network from a particular source to a particular destination. For example, a packet sent from the IAB-donor-DU 702 and destined for the IAB-node 6 714 may be routed either via the path P1 or the path P2. One path may be preferred over another between a same source and a same destination. For example, one path may involve 10 hops, while the other path may involve only 3 hops. In this case, the latter path may be preferred. Therefore, the BAP routing ID may include the BAP path ID that may designate a particular path (e.g., between IAB nodes) to route the traffic to the destination. Load balancing and congestion avoidance may be achieved with the use of the BAP path ID. It should be appreciated that a BAP path ID alone (e.g., path P2) may not include the information about the destination. For example, the path P2 may be used when the destination of the traffic is any one of the IAB-donor DU 702, the IAB-node 1 704, the IAB-node 3 708, the IAB-node 4 710, or the IAB-node 6 714. Therefore, the BAP routing ID may include both the BAP address and the BAP path ID. In one example, the BAP address and the BAP path ID may be concatenated to obtain the BAP routing ID.

A BAP header with a BAP routing ID may be added when a packet enters the BAP layer from upper layers. For endpoints, an AN (e.g., the IAB-node 6 714) may receive upper layer traffic from, e.g., a child UE. A BAP configuration may indicate a mapping between an upper layer traffic flow and a BAP routing ID. For example, based on the BAP configuration, a bearer associated with a first UE served by the AN may be mapped at the AN to a first BAP routing ID (which may, for example, designate the path P1 via the BAP path ID), whereas another bearer associated with a second UE served by the same AN may be mapped at the AN to a second BAP routing ID (which may, for example, designate the path P2 via the BAP path ID). As for the IAB-donor-DU (e.g., the IAB-donor-DU 702), the IAB-donor-DU may receive IP packets via a wired IP network from the associated IAB-donor-CU. The IP packets may carry differentiation labels (e.g., flow labels, etc.). An IP packet received at the IAB-donor-DU may be mapped to a BAP routing ID based on the differentiation label and the BAP configuration. As described above, the BAP routing ID may include information about the path (e.g., path P1, P2, or P3) through which the packet is to be routed as well as the destination for the packet.

An intermediate node may receive a packet on an ingress link. The packet may carry a BAP header including a BAP routing ID. The IAB-donor-CU associated with the intermediate node may configure, for the intermediate node a mapping between a BAP routing ID and an egress link in a routing configuration. Therefore, for example, when IAB-node 1 704 receives a packet destined for IAB-node 6 714, the IAB-node 1 704 may properly route the packet through one of the path P1 or the path P2 according to the BAP routing ID included in the packet.

Figure 8:
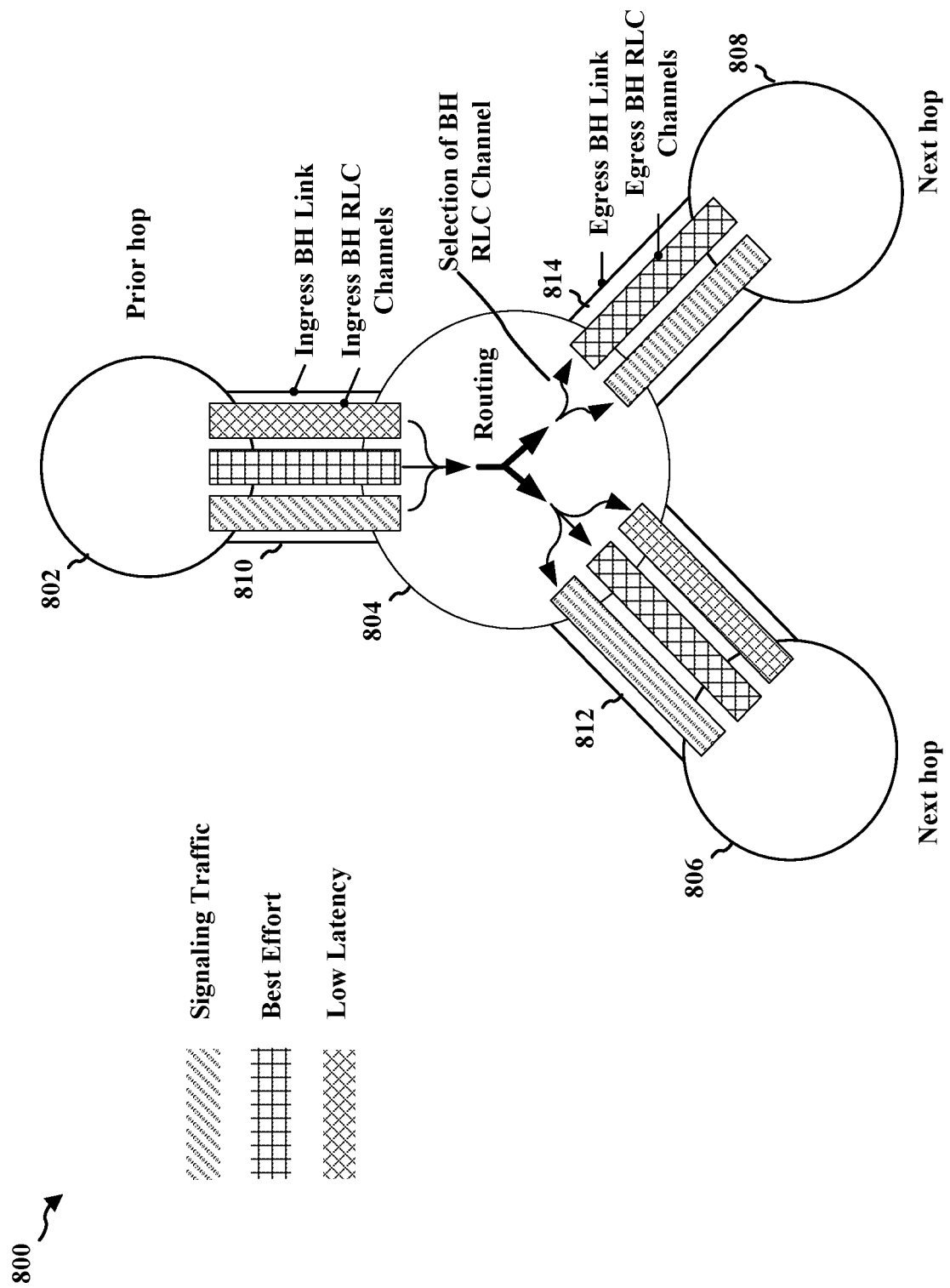
FIG. 8 is a diagram illustrating QoS or traffic priority in an IAB network.

FIG. 8 is a diagram 800 illustrating aspects of QoS or traffic priority in an IAB network. The BAP layer may provide the function of QoS support by means of differentiated RLC channels. Access RLC channels may exist between a UE and a parent DU, or between an MT and a parent DU, and may carry user plane traffic, control plane traffic, or both (e.g., PDCP for RRC or DRB), for the UE or the MT. Each access RLC channel may be associated with a priority. Based on the priority associated with the traffic, an appropriate access RLC channel may be selected to carry the access traffic. Backhaul RLC channels may exist between an MT and a parent DU, and may carry backhaul traffic for UEs and other MTs downstream from the MT. Multiple RLC channels (whether access or backhaul), each of which may be associated with a respective priority that may be different from each other, may be created to enable differentiated services. The QoS and traffic prioritization may be applied, or enforced, through multiple backhaul RLC channels per backhaul link.

A node 804 (e.g., a DU) may have an ingress link 810 with the prior hop node 802, an egress link 812 with the next hop node 806 (e.g., an MT), and an egress link 814 with the next hop node 808 (e.g., an MT). Each ingress or egress link (e.g., 810, 812, 814) may include multiple RLC channels with different priorities (e.g., signaling traffic, best effort, low latency, etc.) to enable differentiated services where differentiated prioritization of traffic is achievable. Therefore, the QoS support function may be provided for the IAB network with the differentiated RLC channels.

At the source endpoint (e.g., an AN for uplink, or an IAB-donor-DU for downlink), an upper layer traffic flow may be mapped to a BAP routing ID to enable the routing function, as described above, and may be further mapped to an egress backhaul RLC channel to realize the QoS support function. In particular, the upper layer traffic may be mapped to backhaul RLC channels with granularity (e.g., F1-U/X2-U: GPT-U tunnel; F1-: non-UE-associated vs. UE-associated F1AP; Non-F1: Type-1/2/3, e.g., for different classes of OAM traffic). At intermediate nodes, to realize the QoS support function, the traffic flow may be mapped to an egress RLC channel based on the ingress RLC channel via which the traffic flow is received, so that the priority associated with the traffic is honored and maintained.

Figure 9A:
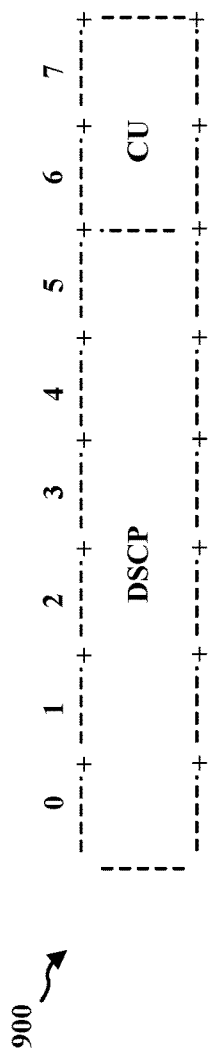
FIG. 9A illustrates an example of header information for differentiated service.

Differentiated services may provide a framework and building blocks to enable deployment of scalable service discrimination on the Internet. In the packet forwarding path, differentiated services (DS) may be realized by mapping the differentiated services code point (DSCP) contained in a field in the IP packet header (e.g., including the fields illustrated in the example header information 900 in FIG. 9A) to a particular forwarding treatment, or per-hop behavior (PHB), at each AN along its path. Six bits of the DS field are used as the DSCP to select the PHB a packet experiences at each node. The two-bit CU field is current reserved. The DSCP field is defined as an unstructured field to facilitate the definition of future per-hop behaviors. With some exceptions, the mapping of DSCPs to PHBs should be configurable. A DS-compliant node should support the logical equivalent of a configurable mapping table from DSCPs to PHBs.

The IP flow label field (referred to herein as IP flow label) may include a 20-bit flow label field in the IP header (e.g., an IPv6 header) that is used by an AN to label packets of a flow. From the viewpoint of the network layer, a flow is a sequence of packets sent from a particular source to a particular unicast, anycast, or multicast destination that an AN intends to label as a flow. An example definition of a flow for this purpose may be any set of packets carrying the same 5-tuple of {destination address, source address, protocol, destination port, source port}. There are cases in which the complete 5-tuple for all packets is not readily available to a forwarding AN, in particular for fragmented packets. In such cases, a flow can be defined by fewer IP header fields, typically using only the 2-tuple {destination address, source address}. The usage of the 3-tuple of the flow label, source address, and destination address fields enables efficient IP flow classification, where only IPv6 main header fields in fixed positions are used. Packets may be processed in a flow-specific manner. To enable flow-label-based classification, source nodes may assign each unrelated transport connection and application data stream to a new flow.

Figure 9C:
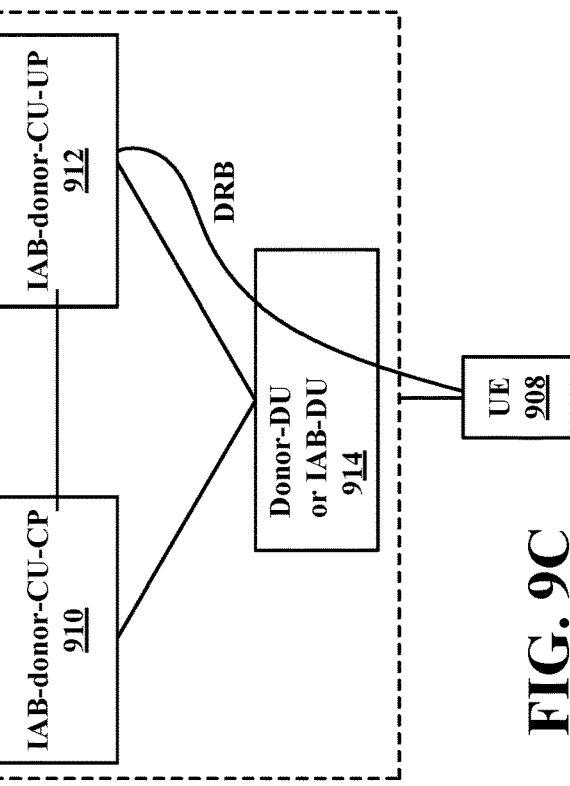
FIG. 9C illustrates example components and an IAB donor node.
Figure 9B:
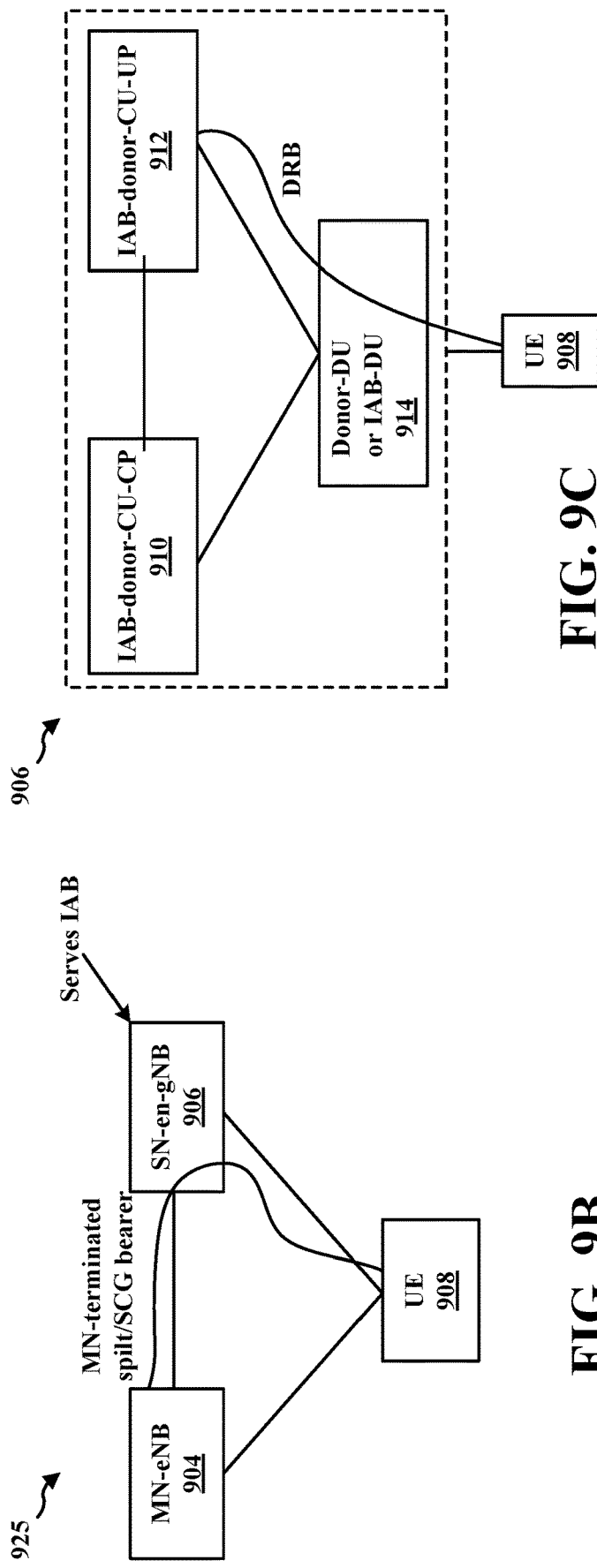
FIG. 9B illustrates an example of a UE having a connection with a primary node and a secondary node.

As illustrated in the diagram 925 of FIG. 9B, a UE 908 may be dual connected to a master node (MN) eNB 904 and a secondary gNB (an IAB-donor) 908 that manages IAB. For each requested E-UTRAN radio access bearer (E-RAB) configured as MN terminated split bearer/secondary cell group (SCG) bearer, if the QoS mapping information element (IE) is contained in the general packet radio service (GPRS) tunnelling protocol (GTP) tunnel endpoint IE in the secondary gNB (SgNB) additional/modification request acknowledge message, the master eNB (MeNB) 904 (also referred to as MN-eNB) shall, if supported, use the IE to set the DSCP and/or flow label fields for the downlink IP packets which are transmitted from the MeNB to a secondary node (SN) enhanced gNB (SN-en-gNB) 906 (serving the IAB) through the GTP tunnels indicated by the GTP tunnel endpoint IE. The SN donor 906 configures a mapping of the received packets from the MN-eNB 904 based on the IP header fields to a route via the IAB backhaul transport.

For each requested DRB, if the QoS mapping information IE is contained in the DL UP parameters IE in the bearer contact setup/modification request message, the gNB CU for user plane (UP) (gNB-CU-UP) shall use the IE to set the DSCP and/or flow label fields in the downlink IP packets that are transmitted through the GTP tunnels indicated by the UP transport layer information IE. A downlink mapping is configured at IAB-donor-DU based on the IP header fields to a BAP route and egress backhaul RLC channel.

A UE 908 may be connected to an IAB-network. The IAB-donor may setup a DRB for the UE. The DRB flows between the IAB-donor-CU and the UE. In some aspects, the IAB-donor-CU may configure a downlink mapping at a donor-DU as previously described. In some aspects, the IAB-donor-CU may configure IP header fields with DSCP/IPv6 flow labels and may send packets to the donor-DU as previously described. In some aspects, the IAB-donor-CU may include the CU-CP 910 and one or more CU-Ups 912, as shown in FIG. 9C. In such aspects, a DRB flow between a CU-UP and the UE may be configured as previously described. The CU-CP may perform bearer setup per DRB at a CU-UP. The CU-CP may configure QoS mapping info at the CU-UP for each requested DRB as previously described. The CU-UP may also configure the IP header fields based on the QoS mapping info as previously described. The downlink mapping may be configured by the CU-CP at the donor-DU as previously described.

The IAB-donor CU may include an IAB-donor CU for the control plane (CP) (IAB-donor-CU-CP) 910 and one or more IAB-donor CUs for the user plane (UP) (IAB-donor-CU-UPs) 912. A DRB flows between an IAB-donor-CU-UP through an IAB-donor-DU or IAB-DU 914 to/from a UE 908. The IAB-donor-CU-UP 912 inserts within an IP packet QoS mapping information, which includes the DSCP and the IP flow label. Based on the QoS mapping information, the IAB-donor-CU-CP 910 configures a routing path for the IAB-donor-DU, so when the IAB-donor-DU receives an IP packet, the IAB-donor-DU decides how to route the traffic.

Figure 10:
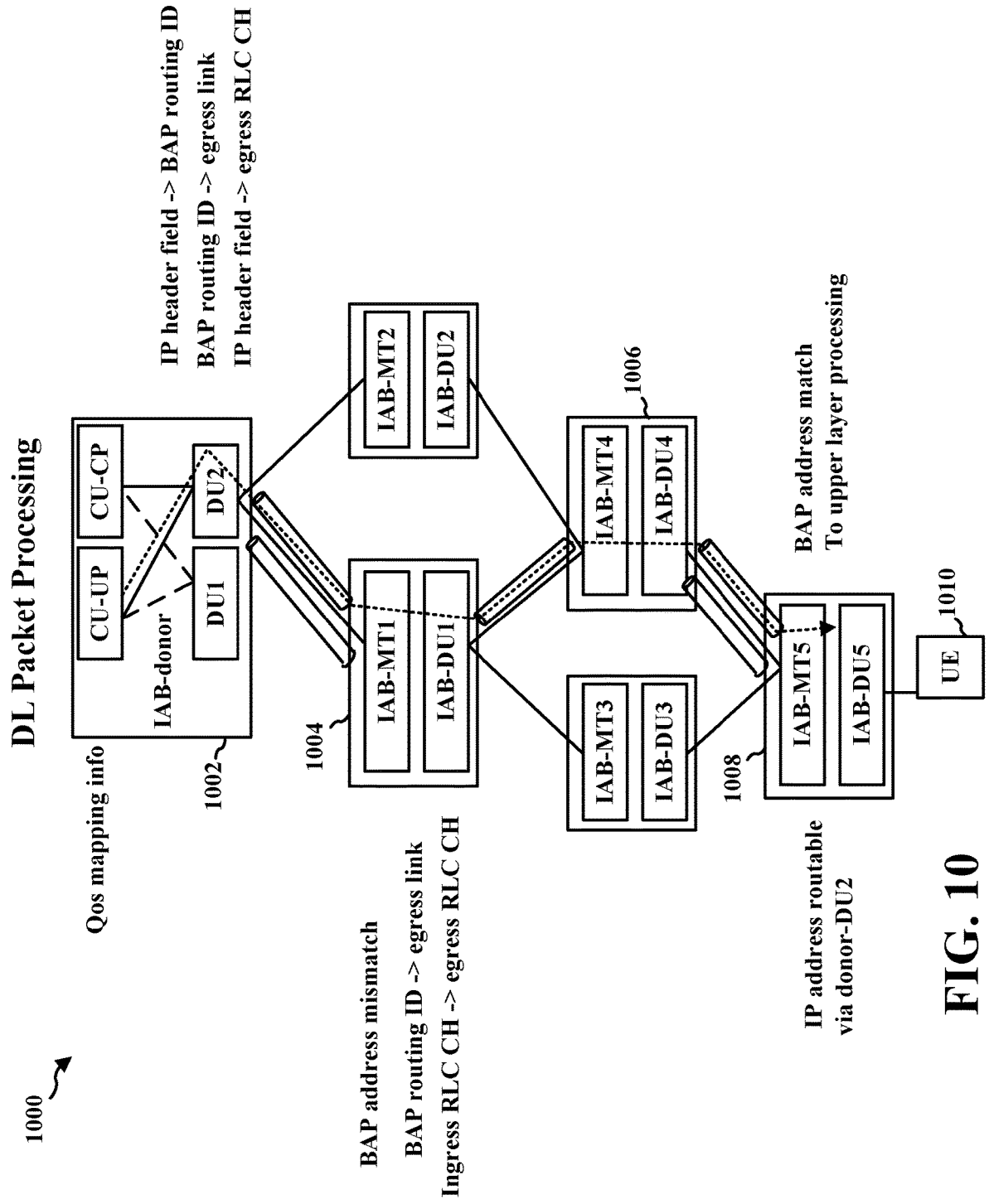
FIG. 10 illustrates an example of downlink packet processing in an IAB network.

FIG. 10 is a diagram 1000 illustrating an IP/BAP configuration for downlink packet processing. As discussed supra, the IAB-donor-CU[-UP] (e.g., IAB donor 1002) inserts within an IP packet QoS mapping information, which includes the DSCP and the IP flow label. Based on the QoS mapping information, the IAB-donor-CU[-CP] configures a routing path for a downlink mapping at the IAB-donor-DU. When the IAB-donor-DU receives an IP packet, the IAB-donor-DU may then decide how to route the traffic based on the IP header and the downlink mapping configuration. The downlink mapping configuration indicates a mapping between the IP header fields (destination IP address, DCSP, and/or IPv6 flow label) and a BAP routing ID. The IAB-donor-DU inserts a BAP header to the packet that carries the BAP routing ID. The IAB-donor-DU further determines an egress link to which to forward the IP packet. The IAB-donor-DU further determines, based on a routing configuration, a mapping between the BAP routing ID and an egress link along which the IAB-donor-DU forwards the BAP packet. The IAB-donor-DU transmits the BAP packet to the IAB-node 1 1004. The IAB-node 1 1004 determines that the BAP address, which may be part of the BAP routing ID and carried in the BAP header, does not match its own BAP address (i.e., there is a BAP address mismatch), and based on the BAP routing ID and a routing configuration, determines the egress link for transmitting the BAP packet. Based on the ingress RLC channel and a channel mapping configuration, the IAB-node 1 1004 determines the egress RLC channel. The IAB-node 1 1004 then transmits the IP packet through the determined link and the egress RLC channel to the IAB-node 4 1006. The same process is followed for IAB-node 4 1006 and IAB-node 5 1008, where IAB-node 5 1008 determines a BAP address match, removes the BAP header, and forwards the IP packet to upper layer processing for transmission to a UE 1010.

Figure 11:
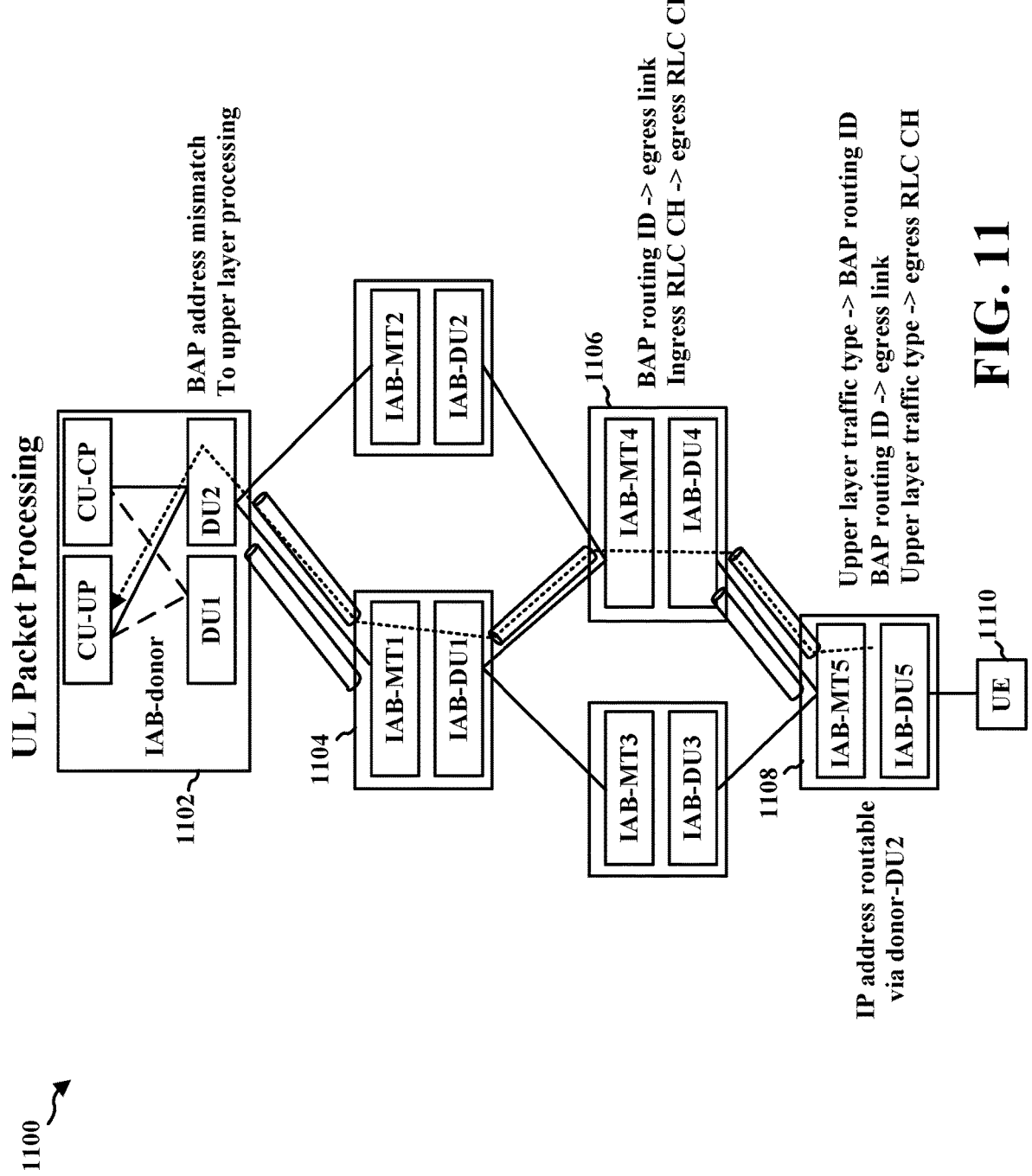
FIG. 11 illustrates an example of uplink packet processing in an IAB network.

FIG. 11 is a diagram 1100 illustrating an IP/BAP configuration for uplink packet processing. For UL, based on the traffic type and an uplink mapping configuration, the IAB-node 5 1108 determines a BAP routing ID for an uplink packet from the UE 1110, and inserts into the BAP header the BAP routing ID. Based on the BAP routing ID and a routing configuration, the IAB-node 5 1108 determines an egress link, and based on the traffic type, determines an egress RLC channel. The IAB-node 5 1108 transmits the IP packet to the IAB-node 4 1106 based on the determined egress link and egress RLC channel. The IAB-node 4 1106 determines, based on the BAP routing ID and a routing configuration, the egress link. The IAB node 4 1106 determines, based on the ingress RLC channel and a channel mapping configuration, the egress RLC channel. The IAB-node 4 1106 transmits the BAP packet to the IAB-node 1 1104 based on the determined egress link and egress RLC channel. The same process is followed by IAB-node 1 1104, and the IP packet is ultimately received and processed by the IAB-donor 1102 where there is a BAP address match.

Figure 12B:
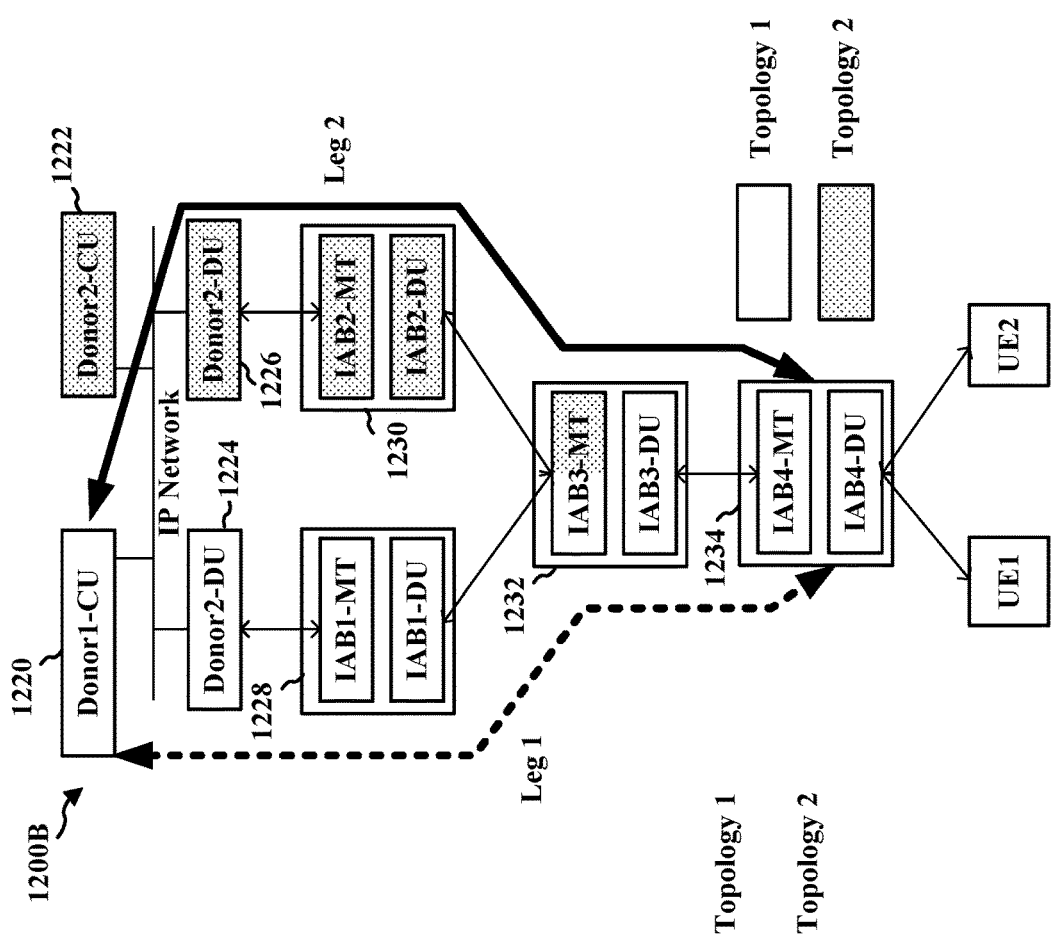
FIGS. 12A and 12B are diagrams illustrating inter-donor topology redundancy in an IAB network.
Figure 12A:
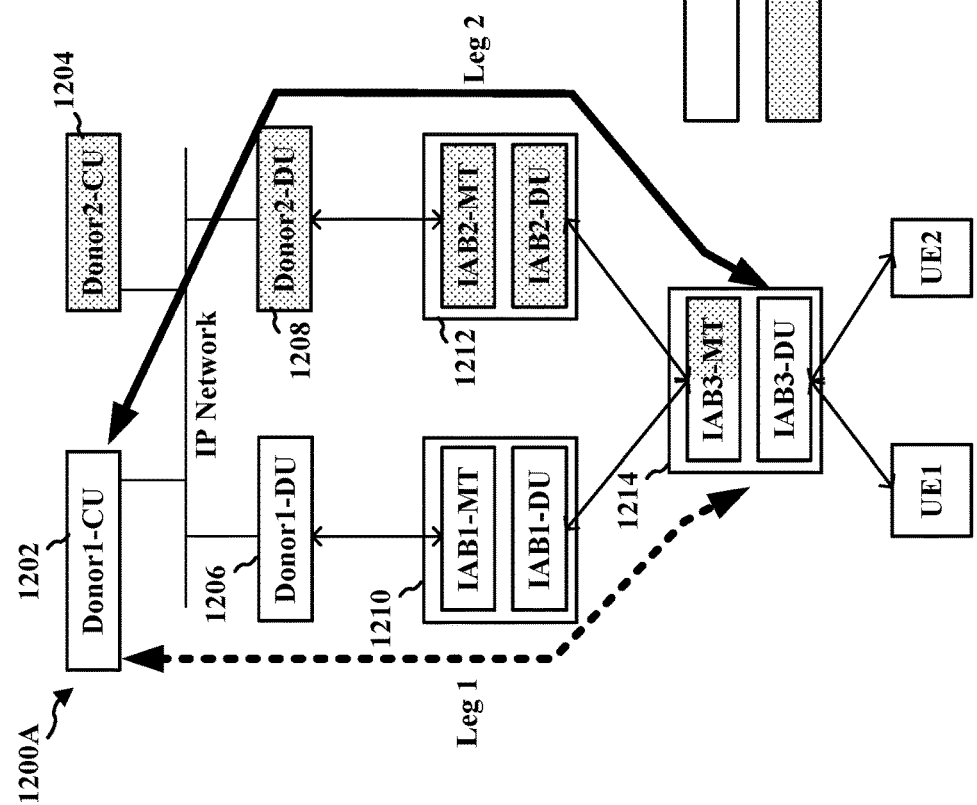

FIGS. 12A and 12B are diagrams 1200A, 1200B illustrating inter-donor topology redundancy in an IAB network. FIG. 12A illustrates a scenario where the destination IAB node is multi-connected with multiple donors. For example, a destination IAB node may be dual connected with two donor nodes. As illustrated, the backhaul link may include a first leg and a second leg between IAB node 1214 and donor1-CU. In FIG. 12A, Topology 1 may be managed by the IAB-donor 1-CU 1202, and Topology 2 may be managed by the IAB-donor 2-CU 1204. Within a same topology, an MT may have an RRC connection with the associated CU, and a DU may have an F1 connection with the associated CU. An IAB node 3 1214 may be dual connected with both the IAB-donor 1-CU 1202 and the IAB-donor 2-CU 1204. In other words, the MT of IAB node 3 1214 may have RRC connections with both the IAB-donor 1-CU 1202 and the IAB-donor 2-CU 1204. However, as will be explained below, offloading traffic from Leg 1 (from IAB-donor 1-CU 1202 to the IAB node 3 1214 via the IAB-donor 1-DU 1206 and the IAB node 1 1210) to Leg 2 (from the IAB-donor 1-CU 1202 to the IAB node 3 1214 via the IAB-donor 2-DU 1208 and the IAB node 2 1212) may not be straightforward.

Even though the two topologies are physically connected via an IP network, to offload traffic from one topology to another for, e.g., load balancing may not be straightforward. For example, the IAB-donor 1-CU 1202 may not have an F1 connection with the IAB-donor 2-DU 1208. Accordingly, the IAB-donor 1-CU 1202 may not directly configure the IAB-donor 2-DU 1208 for either BAP layer routing or channel mapping configuration. Similarly, the IAB-donor 1-CU 1202 may not directly configure the IAB node 2 1212 because it is located in a different topology. It should be appreciated that a same BAP routing ID may have different meaning in different topologies. Therefore, to route traffic via Leg 2 from the IAB-donor 1-CU 1202 to the IAB node 3 1214 via the IAB-donor 2-DU 1208 and the IAB node 2 1212, inter-donor BAP routing may be utilized. In Topology 1, the BAP layer may be configured by the IAB-donor 1-CU 1202, and in Topology 2, the BAP layer may be configured by the IAB-donor 2-CU 1204. A mapping between the BAP configurations for the two topologies may be provided to allow traffic to be routed between the two topologies.

FIG. 12B illustrates a scenario where the direct parent node of the destination IAB node is multi-connected with two donors. In FIG. 12B, Topology 1 may be managed by the IAB-donor 1-CU 1220, and Topology 2 may be managed by the IAB-donor 2-CU 1222. The destination node, the IAB node 4 1234, may be located solely in Topology 1. However, the direct parent node of the IAB node 4 1234, the IAB node 3 1232, may be dual connected with both the IAB-donor 1-CU 1220 and the IAB-donor 2-CU 1222. Similar to the scenario illustrated in FIG. 12A, here, offloading traffic from Leg 1 (from IAB-donor 1-CU 1220 to the IAB node 4 1234 via the IAB-donor 1-DU 1224, the IAB node 1 1228, and the IAB node 3 1232) to Leg 2 (from IAB-donor 1-CU 1220 to the IAB node 4 1234 via the IAB-donor 2-DU 1226, the IAB node 2 1230, and the IAB node 3 1232) may not be straightforward, even though the MT of IAB node 3 1232 may have RRC connections with both the IAB-donor 1-CU 1220 and the IAB-donor 2-CU 1222. Inter-donor BAP routing where a mapping between the BAP configurations for the two topologies may be provided may be utilized in order to route traffic via Leg 2.

Various methods may enable inter-topology BAP routing between two topologies. For example, the two IAB-donor-CUs may coordinate with each other and exchange the QoS information and the QoS mapping information to enable inter-topology BAP routing. In another example, the destination IAB node may be configured with two IP addresses each of which is anchored at a respective IAB-donor-DU (associated with a respective IAB-donor-CU) to enable inter-topology BAP routing. In another example, an IAB node at the boundary of the two topologies (e.g., a dual connected node) may be utilized to map the BAP routing IDs and RLC channels between the two topologies. This may be performed at either the IP layer or the BAP layer. In another example, BAP routing IDs may be defined in a global manner, such that a BAP routing ID meant for one topology may not cause confusion in the other topology. Aspects relating to inter-topology BAP routing among three or more topologies are described hereinafter.

Figure 13:
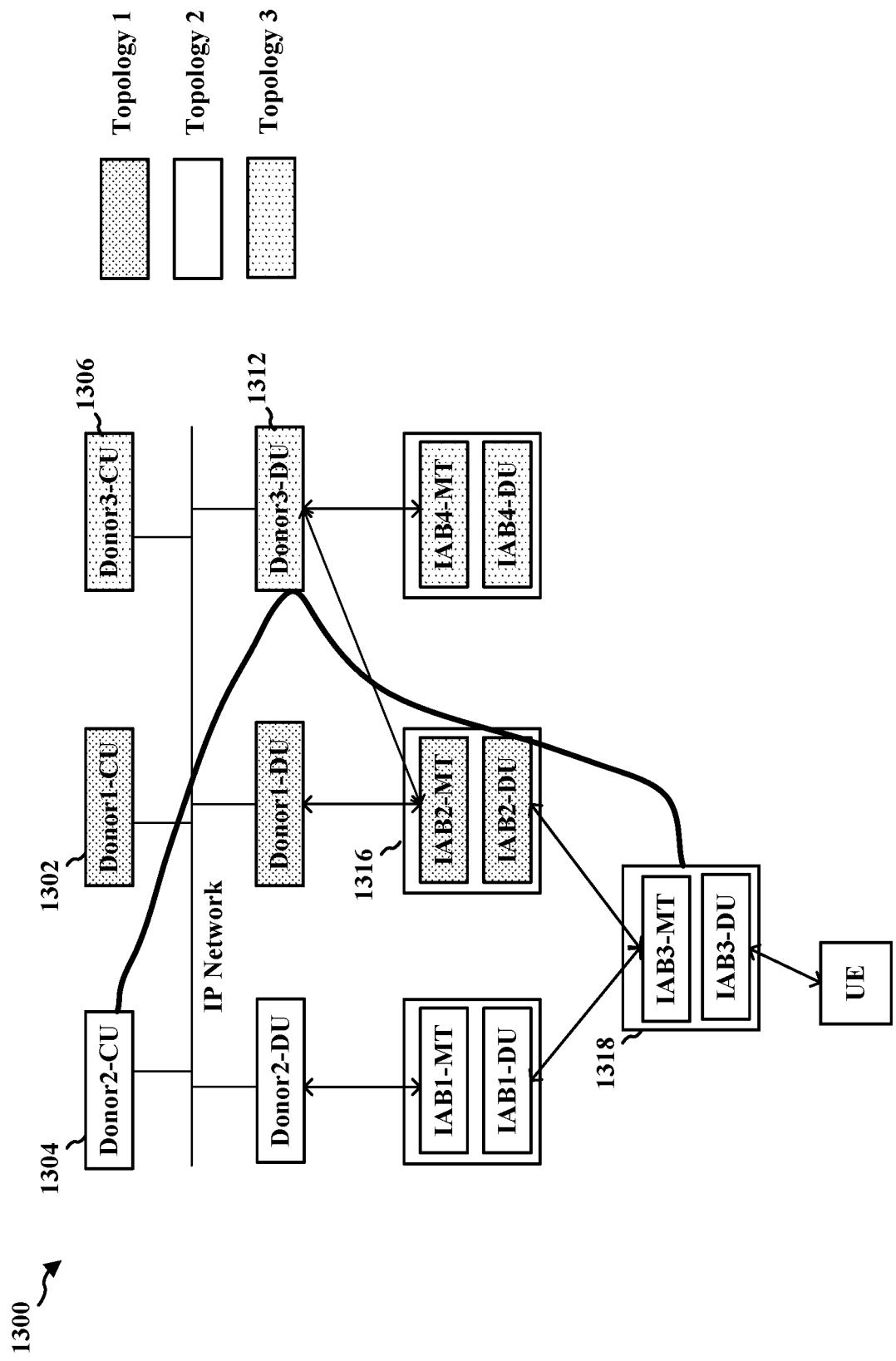
FIG. 13 is a diagram illustrating multi-donor BAP routing in an IAB network according to one aspect.

FIG. 13 is a diagram 1300 illustrating multi-donor BAP routing in an IAB network according to one aspect. Three topologies are illustrated in FIG. 13. Topology 1 may be managed by the IAB-donor 1-CU 1302. Topology 2 may be managed by the IAB-donor 2-CU 1304. Topology 3 may be managed by the IAB-donor 3-CU 1306. FIG. 13 is illustrative, and does not limit the disclosure. The aspects described in connection with FIG. 13 may be similarly applied to scenarios where any of the topologies includes two, three, or more IAB nodes, or where the network includes four or more topologies exist. The solutions may apply to simultaneous connectivity scenarios and inter-donor gradual migration scenarios where boundaries along a chain of IAB nodes are created.

In one example, the IAB-donor 2-CU 1304 may attempt to transmit traffic destined for the IAB node 3 1318, which may be located within Topology 2. However, the path within Topology 2 may be congested. Accordingly, the IAB-donor 2-CU 1304 may attempt to offload some or all of the traffic to Topology 1 under the management of the IAB-donor 1-CU 1302. In turn, the IAB-donor 1-CU 1302 may attempt to offload some or all of the traffic to Topology 3 under the management of the IAB-donor 3-CU 1306. A boundary node, i.e., the IAB node 3 1318 may be connected to both Topology 2 and Topology 1. Another boundary node, i.e., the IAB node 2 1316 may be connected to both Topology 2 and Topology 3. Accordingly, existing methods, including the methods that leverage the boundary node to enable inter-topology BAP routing between two topologies, may be utilized to first offload the traffic from Topology 2 to Topology 1, and then from Topology 1 to Topology 3.

Figure 14:
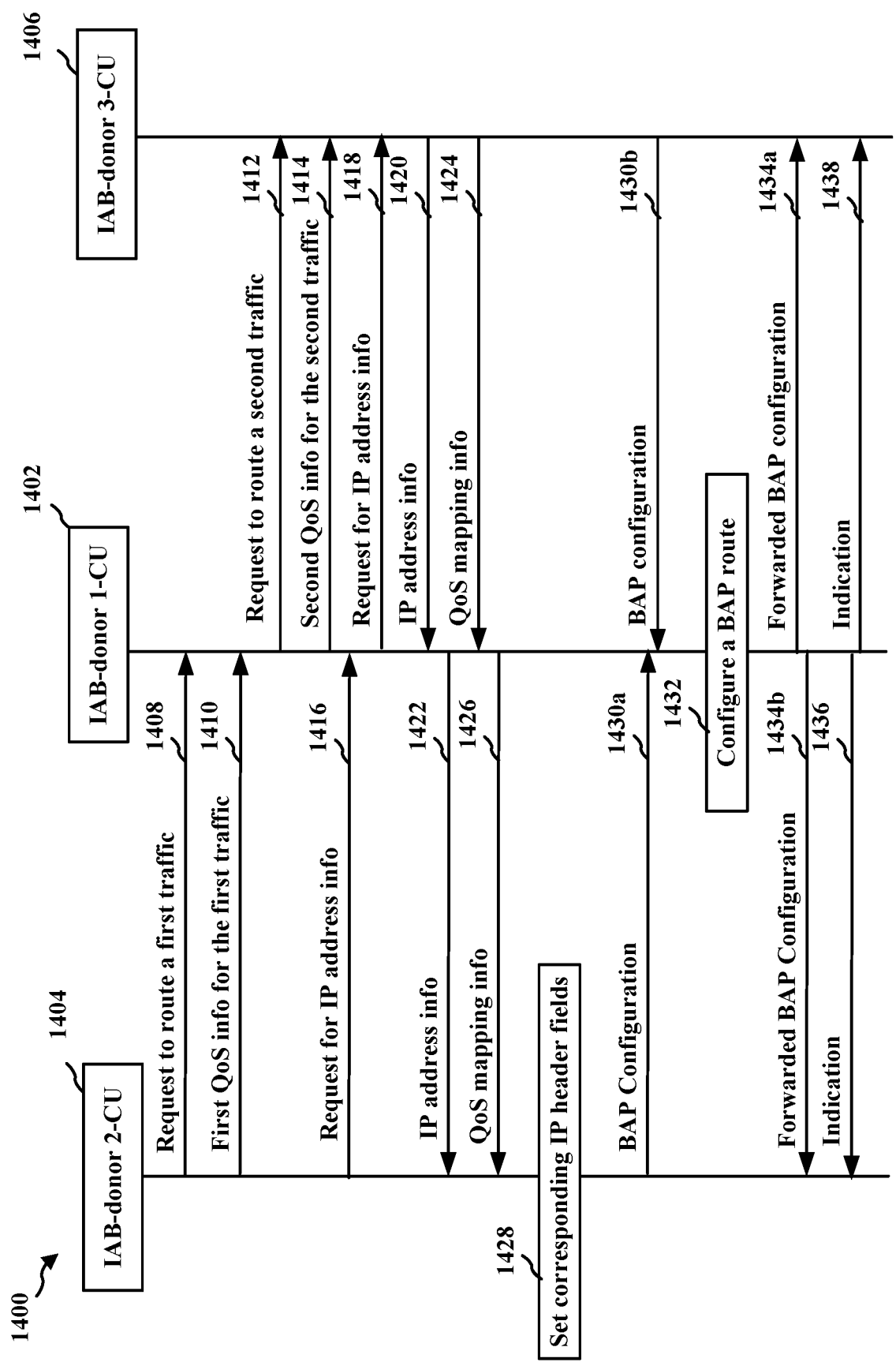
FIG. 14 a diagram illustrating an example communication flow including multi-donor BAP routing.

FIG. 14 is a diagram 1400 illustrating an example communication flow including multi-donor BAP routing. The IAB-donor 1 CU 1402, the IAB-donor 2-CU 1404, and the IAB-donor 3-CU 1406 may correspond to the IAB-donor 1 CU 1302, the IAB-donor 2-CU 1304, and the IAB-donor 3-CU 1306 in FIG. 13, respectively. At 1408, the IAB-donor 1-CU 1302/1402 may receive from the IAB-donor 2-CU 1304/1404, and the IAB-donor 2-CU 1304/1404 may transmit to the IAB-donor 1-CU 1302/1402, a request to backhaul a first traffic between a first IAB node (e.g., IAB node 3 1318) associated with the IAB-donor 2-CU 1304/1404 and a second IAB node (e.g., IAB node 2 1316) associated with the IAB-donor 1 CU 1302/1402. In one aspect, the first IAB node may be an IAB-donor-DU. At 1410, the IAB-donor 1-CU 1302/1402 may receive from the IAB-donor 2-CU 1304/1404, and the IAB-donor 2-CU 1304/1404 may transmit to the IAB-donor 1-CU 1302/1402, first QoS information for the first traffic. The first QoS information for the first traffic may be desired because the first traffic may include multiple bearers, and the availability of the first QoS information may allow the IAB-donor 1-CU 1302/1402 and the IAB-donor 3-CU 1306/1406 to properly assess whether the QoS demand associated with the first traffic can be met. At 1412, the IAB-donor 1-CU 1302/1402 may transmit to the IAB-donor 3-CU 1306/1406, and the IAB-donor 3-CU 1306/1406 may receive from the IAB-donor 1-CU 1302/1402, a request to backhaul a second traffic between a third IAB node (e.g., IAB node 2 1316) associated with the IAB-donor 1-CU 1302/1402 and a fourth IAB node (e.g., IAB-donor 3-DU 1312) associated with the IAB-donor 3-CU 1306/1406. In one aspect, the fourth IAB node may be an IAB-donor-DU. At least part of the second traffic may also be part of the first traffic. The first traffic or the second traffic may be uplink traffic, downlink traffic, or bidirectional traffic.

At 1414, the IAB-donor 1-CU 1302/1402 may transmit to the IAB-donor 3-CU 1306/1406, and the IAB-donor 3-CU 1306/1406 may receive from the IAB-donor 1-CU 1302/1402, second QoS information for the second traffic. The second QoS information may be based at least in part on the first QoS Information.

In the aspect illustrated in FIG. 13, the second IAB node and the third IAB node may correspond to a same IAB node, i.e., the IAB node 2 1316. However, in other aspects (now shown), the second IAB node and the third IAB node may correspond to a different IAB nodes.

The association of an IAB node with an IAB-donor-CU may be defined by an RRC connection (in the case of an association between an IAB-node-MT and an IAB-donor-CU) or an F1 control plane (F1-C) connection (in the case of an association between an IAB-node-DU and an IAB-donor-CU) between the IAB node and the IAB-donor-CU.

The first QoS information and the second QoS information may be specified at one of a number of possible levels of granularity. In particular, the first QoS information and the second QoS information may be specified for a radio bearer of the first or the second traffic, an F1 user plane (F1-U) tunnel of the first or the second traffic, a QoS flow of the first or the second traffic, or a backhaul RLC channel that carries the first or the second traffic, or any combination thereof. It should be appreciated that a radio bearer may refer to an end-to-end connection between a UE and an IAB-donor-CU that serves the UE. An F1-U tunnel may refer to the tunnel between the IAB-donor-CU and the IAB node-DU that serves a UE. Therefore, a radio bearer may be carried by one or more F1-U tunnels and an access RLC channel. One radio bearer may be mapped to multiple F1-U tunnels. A QoS flow may refer to a constituent part of a radio bearer. A backhaul RLC channel may aggregate multiple radio bearers.

The first QoS information and the second QoS information may be specified at the same level of granularity, or at different levels of granularity. It should be appreciated that the first QoS information and the second QoS information may be specified at different levels of granularity even if the first traffic and the second traffic are the same. For example, the first IAB node may be an AN, and the first QoS information may accordingly be specified for a radio bearer of the first traffic. Further, the third IAB node may be an intermediate node, and the second QoS information may accordingly be specified for a backhaul RLC channel that carries the radio bearer of the second traffic. In a different example, the second QoS information may be specified for the radio bearer of the second traffic (i.e., at the same level of granularity as the first QoS information).

In one aspect, at 1416, the IAB-donor 1-CU 1302/1402 may receive from the IAB-donor 2-CU 1304/1404, and the IAB-donor 2-CU 1304/1404 may transmit to the IAB-donor 1-CU 1302/1402, a request for IP address information. The IAB-donor 2-CU 1304/1404 may explicitly request the IP address information because the IAB-donor 2-CU 1304/1404 may oversee multiple rerouted traffic flows, and absent an explicit IP address information request, the IAB-donor 1-CU 1302/1402 may not know where the path terminates in Topology 2. The IAB-donor 2-CU 1304/1404 may transmit additional requests for IP address information when additional IP addresses are needed. At 1418, the IAB-donor 1-CU 1302/1402 may forward to the IAB-donor 3-CU 1306/1406, and the IAB-donor 3-CU 1306/1406 may receive from the IAB-donor 1-CU 1302/1402, the request for the IP address information. The IAB-donor 3-CU 1306/1406 may generate the IP address information based on the request. At 1420, (based on the request), the IAB-donor 1-CU 1302/1402 may receive from the IAB-donor 3-CU 1306/1406, and the IAB-donor 3-CU 1306/1406 may transmit to the IAB-donor 1-CU 1302/1402, the IP address information. At 1422, (based on the request), the IAB-donor 1-CU 1302/1402 may forward to the IAB-donor 2-CU 1304/1404, and the IAB-donor 2-CU 1304/1404 may receive from the IAB-donor 1-CU 1302/1402, the IP address information. The IP address information may be used at the IAB-donor 2-CU 1304/1404 to communicate the first traffic. In particular, the IAB-donor 2-CU 1304/1404 may allocate the IP address information to an access IAB node managed by the IAB-donor 2-CU 1304/1404 (e.g., the IAB node 3 1318), and the communication between the IAB-donor 2-CU 1304/1404 and the access IAB node (e.g., the IAB node 3 1318) may be via the anchor IAB-donor 3-DU 1312. The IP address information may be an IP address or an IP prefix. An IP prefix may be an aggregation of IP addresses. The IP address information may be anchored at an IAB-donor-DU (e.g., IAB-donor 3-DU 1312) associated with the IAB-donor 3-CU 1306/1406. In other words, the IAB-donor 3-DU 1312 may be IP routable based on the IP address information. Therefore, IP packets in the first traffic may carry the IP address information. The IP address information or the request for the IP address information may indicate usage (e.g., control plane traffic, user plane traffic, or both) associated with the IP address or IP prefix.

At 1424, the IAB-donor 1-CU 1302/1402 may receive from the IAB-donor 3-CU 1306/1406, and the IAB-donor 3-CU 1306/1406 may transmit to the IAB-donor 1-CU 1302/1402, QoS mapping information. At 1426, the IAB-donor 1-CU 1302/1402 may forward to the IAB-donor 2-CU 1304/1404, and the IAB-donor 2-CU 1304/1404 may receive from the IAB-donor 1-CU 1302/1402, the QoS mapping information. It should be appreciated that the QoS mapping information may be different from the QoS information. In particular, the QoS mapping information may include mappings between upper layer traffic and the BAP routing ID. Based on the QoS mapping information, an IAB-donor-DU (e.g., the IAB-donor 3-DU 1312) may map IP packets to BAP routing IDs, egress links, and backhaul RLC channels, as configured by the associated IAB-donor-CU. The QoS mapping information may include values for IP header fields, e.g., a DSCP value and/or an IPv6 flow label value for differentiated services in IP connectivity. At 1428, the IAB-donor 2 CU 1304/1404 may set corresponding IP header fields of the first traffic to be rerouted via an IAB node associated with the IAB-donor 3-CU 1306/1406. Accordingly, the IAB-donor 3-DU 1312 may properly map the traffic to the appropriate BAP routing ID and the appropriate backhaul RLC channel.

In one aspect where the first traffic or the second traffic includes downlink traffic, at 1430a, the IAB-donor 1-CU 1302/1402 may receive from the IAB-donor 2-CU 1304/1404, and the IAB-donor 2-CU 1304/1404 may transmit to the IAB-donor 1-CU 1302/1402, a BAP configuration. In one aspect where globally defined BAP configurations are utilized, the BAP configuration may include an identifier of the IAB-donor 2-CU 1304/1404 (i.e., the IAB-donor-CU that selected the global route). At 1432, the IAB-donor 1-CU 1302/1402 may configure a BAP route that may carry the first traffic or the second traffic between the second IAB node and the third IAB node based on the BAP configuration. At 1434a, the IAB-donor 1-CU 1302/1402 may forward to the IAB-donor 3-CU 1306/1406, and the IAB-donor 3-CU 1306/1406 may receive from the IAB-donor 1-CU 1302/1402, the BAP configuration. The BAP configuration may include a BAP routing ID, a BAP destination, or a BAP path ID.

In one aspect where the first traffic or the second traffic includes uplink traffic, at 1430b, the IAB-donor 1-CU 1302/1402 may receive from the IAB-donor 3-CU 1306/1406, and the IAB-donor 3-CU 1306/1406 may transmit to the IAB-donor 1-CU 1302/1402, a BAP configuration. In one aspect where globally defined BAP configurations are utilized, the BAP configuration may include an identifier of the IAB-donor 3-CU 1306/1406 (i.e., the IAB-donor-CU that selected the global route). At 1432, the IAB-donor 1-CU 1302/1402 may configure a BAP route that may carry the first traffic or the second traffic between the second IAB node and the third IAB node based on the BAP configuration. At 1434b, the IAB-donor 1-CU 1302/1402 may forward to the IAB-donor 2-CU 1304/1404, and the IAB-donor 2-CU 1304/1404 may receive from the IAB-donor 1-CU 1302/1402, the BAP configuration. The BAP configuration may include a BAP routing ID, a BAP destination, or a BAP path ID.

At 1436, the IAB-donor 1-CU 1302/1402 may transmit to the IAB-donor 2-CU 1304/1404, and the IAB-donor 2-CU 1304/1404 may receive from the IAB-donor 1-CU 1302/1402, an indication that at least part of the first traffic may be rerouted through an IAB node associated with the IAB-donor 3-CU 1306/1406. At 1438, the IAB-donor 1-CU 1302/1402 may transmit to the IAB-donor 3-CU 1306/1406, and the IAB-donor 3-CU 1306/1406 may receive from the IAB-donor 1-CU 1302/1402, an indication that at least part of the second traffic may be associated with the IAB-donor 2-CU 1304/1404.

Figure 15:
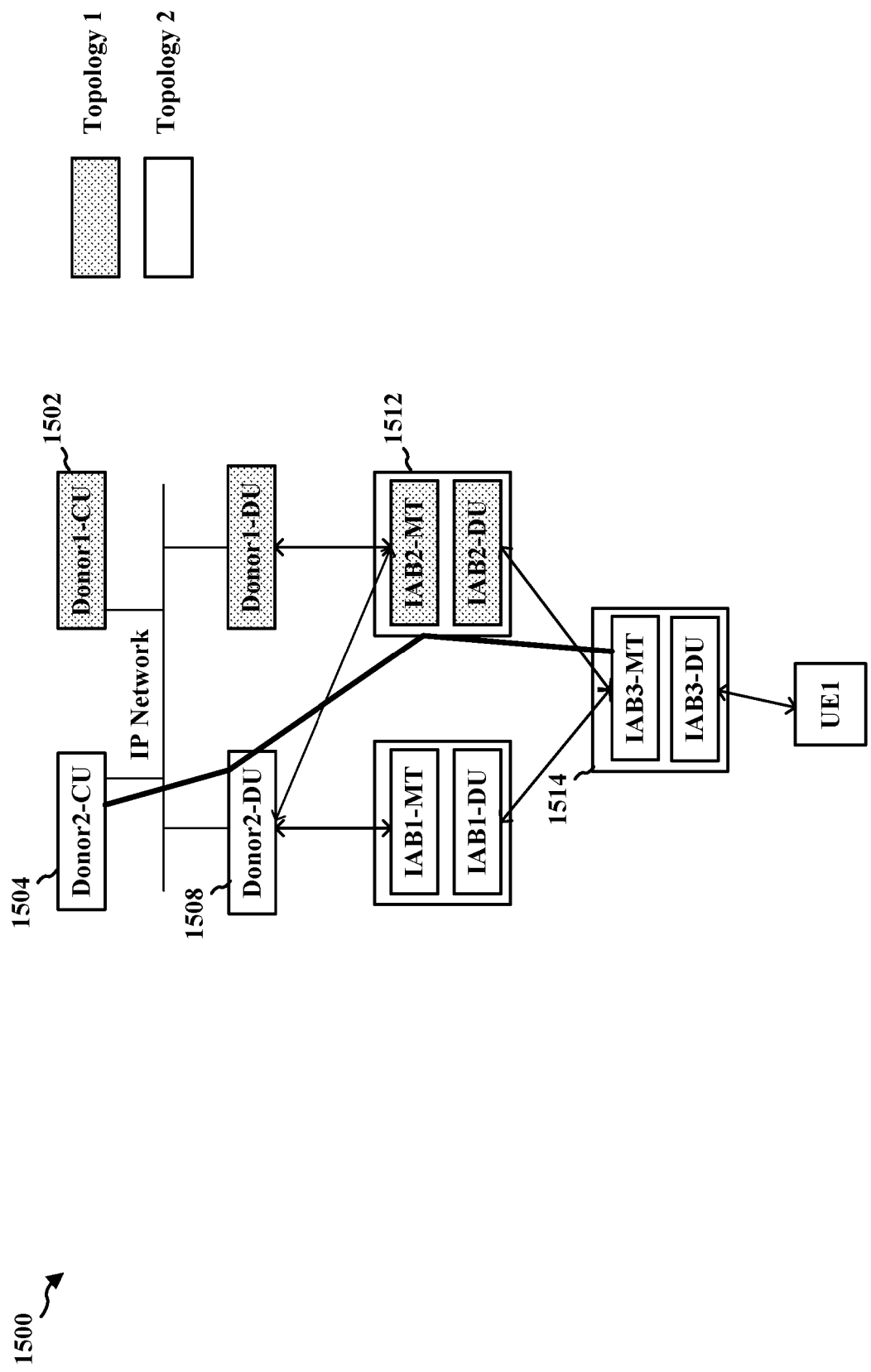
FIG. 15 is a diagram illustrating inter-topology BAP routing in an IAB network according to one aspect.

FIG. 15 is a diagram 1500 illustrating inter-topology BAP routing in an IAB network according to one aspect. It should be appreciated that the scenario illustrated in FIG. 15 may be understood as a special case of the scenario illustrated in FIG. 13, where the IAB-donor 2-CU 1304 and the IAB-donor 3-CU 1306 are a same IAB-donor CU, and collapsed into the IAB-donor 2-CU 1504. One IAB-donor-CU may not have knowledge of an adjacent topology managed by another IAB-donor-CU. The aspects described above in relation to FIGS. 13 and 14 may be adapted for the scenario illustrated in FIG. 15, to provide inter-topology BAP routing. For example, in FIG. 15, traffic may be offloaded back and forth multiple times between Topology 1 and Topology 2.

Figure 16:
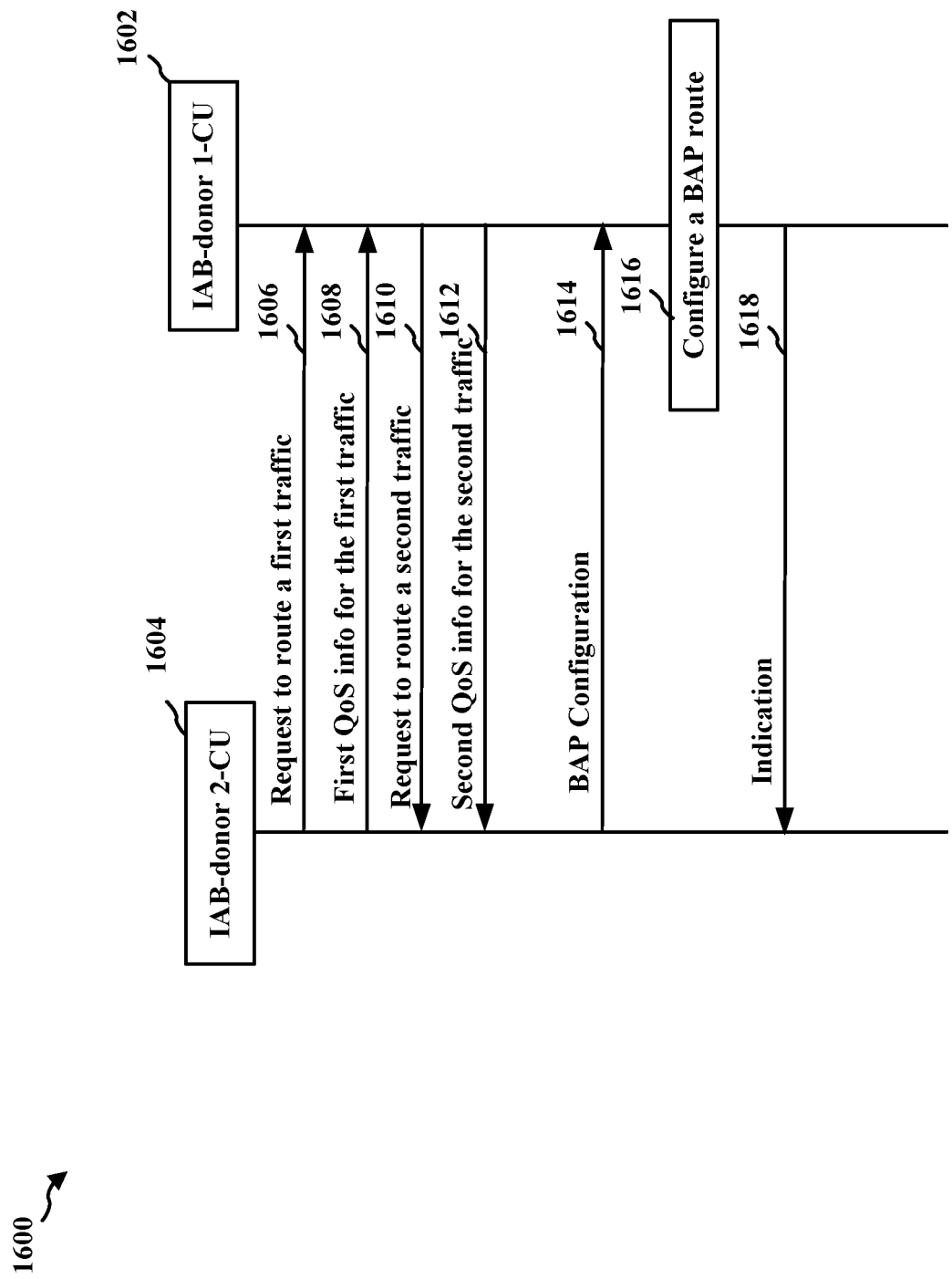
FIG. 16 is a diagram illustrating an example communication flow including multi-boundary BAP routing.

FIG. 16 is a diagram 1600 illustrating an example communication flow including multi-boundary BAP routing. The IAB-donor 1 CU 1602 and the IAB-donor 2-CU 1604 may correspond to the IAB-donor 1 CU 1502 and the IAB-donor 2-CU 1504, respectively. At 1606, the IAB-donor 1-CU 1502/1602 may receive from the IAB-donor 2-CU 1504/1604, and the IAB-donor 2-CU 1504/1604 may transmit to the IAB-donor 1-CU 1502/1602, a request to backhaul a first traffic between a first IAB node (e.g., IAB node 3 1514) associated with the IAB-donor 2-CU 1304/1404 and a second IAB node (e.g., IAB node 2 1512) associated with the IAB-donor 1 CU 1302/1402. At 1608, the IAB-donor 1-CU 1502/1602 may receive from the IAB-donor 2-CU 1504/1604, and the IAB-donor 2-CU 1504/1604 may transmit to the IAB-donor 1-CU 1502/1602, first QoS information for the first traffic. At 1610, the IAB-donor 1-CU 1502/1602 may transmit to the IAB-donor 2-CU 1504/1604, and the IAB-donor 2-CU 1504/1604 may receive from the IAB-donor 1-CU 1502/1602, a request to backhaul a second traffic between a third IAB node (e.g., IAB node 2 1512) associated with the IAB-donor 1-CU 1302/1402 and a fourth IAB node (e.g., IAB-donor 2-DU 1508) associated with the IAB-donor 2-CU 1304/1404.

At 1612, the IAB-donor 1-CU 1502/1602 may transmit to the IAB-donor 2-CU 1504/1604, and the IAB-donor 2-CU 1504/1604 may receive from the IAB-donor 1-CU 1502/1602, second QoS information for the second traffic. It should be appreciated that in some aspects, the IAB-donor1-CU 1502/1602 may implicitly provide the second QoS information for the second traffic to the IAB-donor 2-CU 1504/1604 by indicating to the IAB-donor 2-CU 1504/1604 that the second traffic may be at least part of the first traffic.

At 1614, the IAB-donor 1-CU 1502/1602 may receive from the IAB-donor 2-CU 1504/1604, and the IAB-donor 2-CU 1504/1604 may transmit to the IAB-donor 1-CU 1502/1602, a BAP configuration. At 1616, the IAB-donor 1-CU 1502/1602 may configure a BAP route that may carry the first traffic or the second traffic between the second IAB node (e.g., IAB node 2 1512) and the third IAB node (e.g., IAB node 2 1512) based on the BAP configuration. The IAB-donor 2-CU 1504/1604 may already be aware of the BAP configuration, and the IAB-donor 1-CU 1502/1602 may not forward to the IAB-donor 2-CU 1504/1604 the BAP configuration that was received from the IAB-donor 1-CU 1502/1602.

At 1618, the IAB-donor 1-CU 1502/1602 may transmit to the IAB-donor 2-CU 1504/1604, and the IAB-donor 2-CU 1504/1604 may receive from the IAB-donor 1-CU 1502/1602, an indication that the second traffic may be at least part of the first traffic.

Figure 17:
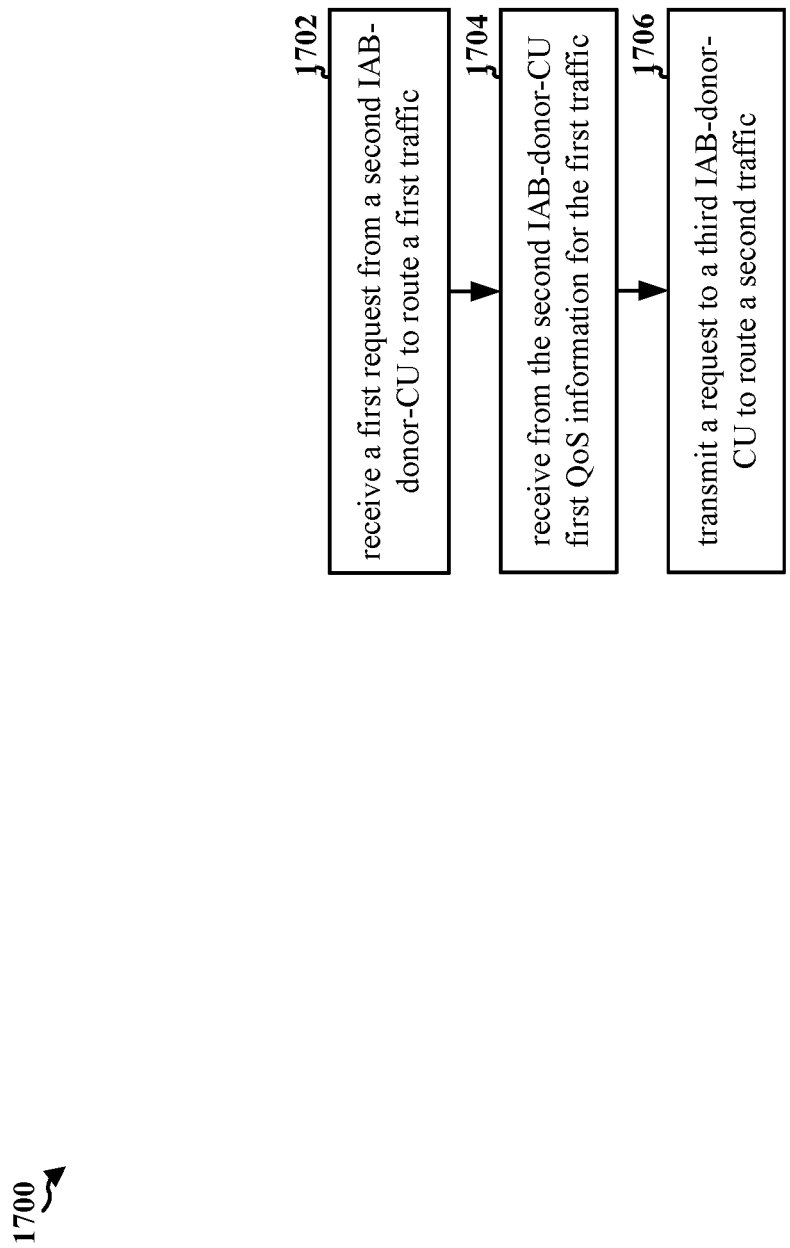
FIG. 17 is a flowchart of a method of wireless communication.

FIG. 17 is a flowchart 1700 of a method of wireless communication. The method may be performed by a first IAB-donor-CU (e.g., the IAB-donor-CU in the IAB-donor node 103; the IAB-donor 1-CU 1302/1402; the apparatus 2302). The method may enable multi-donor BAP routing in an IAB network.

At 1702, the first IAB-donor-CU may receive a first request from a second IAB-donor-CU (e.g., the IAB-donor 2-CU 1304/1404) to route a first traffic between a first IAB node (e.g., the IAB node 3 1318) associated with the second IAB-donor-CU (e.g., the IAB-donor 2-CU 1304/1404) and a second IAB node (e.g., the IAB node 2 1316) associated with the first IAB-donor-CU. For example, 1702 may be performed by the first traffic component 2340 in FIG. 23. FIG. 14 illustrates an example request 1408 to route traffic.

At 1704, the first IAB-donor-CU may receive from the second IAB-donor-CU (e.g., the IAB-donor 2-CU 1304/1404) first QoS information for the first traffic. For example, 1704 may be performed by the first QoS component 2342 in FIG. 23. FIG. 14 illustrates an example of QoS information 1410 received from an IAB node that is requesting routing of traffic.

At 1706, the first IAB-donor-CU may transmit a request to a third IAB-donor-CU (e.g., the IAB-donor 3-CU 1306/1406) to route a second traffic between a third IAB node (e.g., the IAB node 2 1316) associated with the first IAB-donor-CU and a fourth IAB node (e.g., the IAB-donor 3-DU 1312) associated with the third IAB-donor-CU (e.g., the IAB-donor 3-CU 1306/1406). For example, 1706 may be performed by the second traffic component 2344 in FIG. 23. FIG. 14 illustrates an example request 1412 being sent to a third IAB node.

Figure 18:
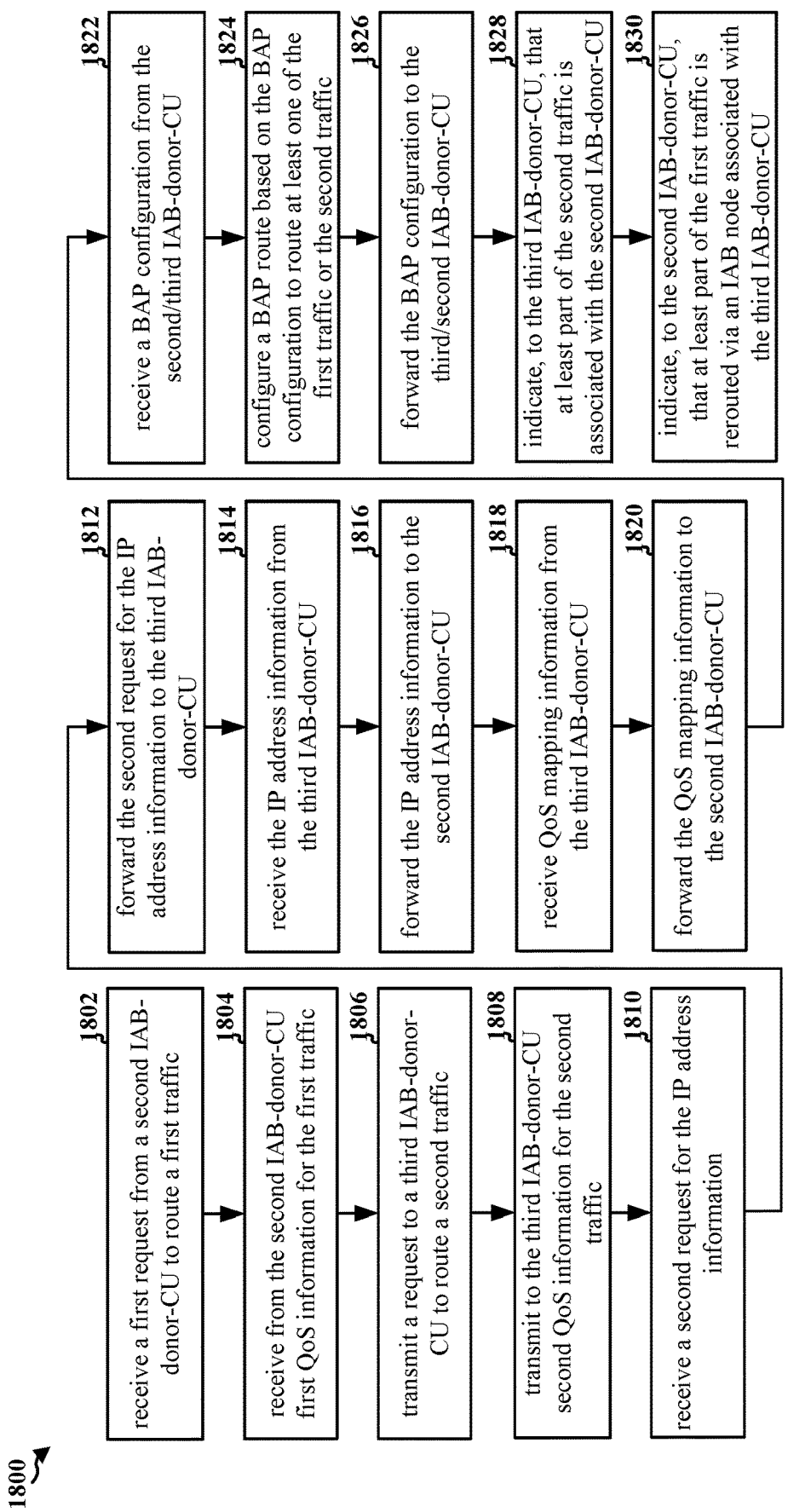
FIG. 18 is a flowchart of a method of wireless communication.

FIG. 18 is a flowchart 1800 of a method of wireless communication. The method may be performed by a first IAB-donor-CU (e.g., the IAB-donor-CU in the IAB-donor node 103; the IAB-donor 1-CU 1302/1402; the apparatus 2302). The method may enable multi-donor BAP routing in an IAB network.

At 1802, the first IAB-donor-CU may receive a first request from a second IAB-donor-CU (e.g., the IAB-donor 2-CU 1304/1404) to route a first traffic between a first IAB node (e.g., the IAB node 3 1318) associated with the second IAB-donor-CU (e.g., the IAB-donor 2-CU 1304/1404) and a second IAB node (e.g., the IAB node 2 1316) associated with the first IAB-donor-CU. For example, 1802 may be performed by the first traffic component 2340 in FIG. 23. FIG. 14 illustrates an example request 1408 to route traffic.

At 1804, the first IAB-donor-CU may receive from the second IAB-donor-CU (e.g., the IAB-donor 2-CU 1304/1404) first QoS information for the first traffic. For example, 1804 may be performed by the first QoS component 2342 in FIG. 23. FIG. 14 illustrates an example of QoS information 1410 received from an IAB node that is requesting routing of traffic.

At 1806, the first IAB-donor-CU may transmit a request to a third IAB-donor-CU (e.g., the IAB-donor 3-CU 1306/1406) to route a second traffic between a third IAB node (e.g., the IAB node 2 1316) associated with the first IAB-donor-CU and a fourth IAB node (e.g., the IAB-donor 3-DU 1312) associated with the third IAB-donor-CU (e.g., the IAB-donor 3-CU 1306/1406). For example, 1806 may be performed by the second traffic component 2344 in FIG. 23. FIG. 14 illustrates an example request 1412 being sent to a third IAB node.

At 1808, the first IAB-donor-CU may transmit to the third IAB-donor-CU (e.g., the IAB-donor 3-CU 1306/1406) second QoS information for the second traffic. The second QoS information may be based at least in part on the first QoS information. For example, 1808 may be performed by the second QoS component 2346 in FIG. 23. FIG. 14 illustrates an example of QoS information 1414 being provided to the third IAB node. Each of the first QoS information and the second QoS information may be associated with at least one of a radio bearer of respective traffic, an F1-U tunnel of the respective traffic, a QoS flow of the respective traffic, or a backhaul RLC channel that may carry the respective traffic. In one aspect, the first QoS information may be specified at a same level of granularity as the second QoS information. In another aspect, the first QoS information is specified at a different level of granularity from the second QoS information.

In one aspect, the first IAB node (e.g., the IAB node 3 1318) may be associated with the second IAB-donor-CU (e.g., the IAB-donor 2-CU 1304/1404) via an RRC connection or an F1-C connection. The second and the third IAB nodes (e.g., the IAB node 2 1316) may be associated with the first IAB-donor-CU via a respective RRC connection or a respective F1-C connection. The fourth IAB node (e.g., the IAB-donor 3-DU 1312) may be associated with the third IAB-donor-CU (e.g., the IAB-donor 3-CU 1306/1406) via an RRC connection or an F1-C connection.

Each of the first IAB node or the fourth IAB node may be an IAB-donor node (e.g., an IAB-donor-DU). The second IAB node (e.g., the IAB node 2 1316) and the third IAB node (e.g., the IAB node 2 1316) may be a same node. Each of the first traffic and the second traffic may include one of an uplink traffic, a downlink traffic, or a bidirectional traffic.

At 1810, the first IAB-donor-CU may receive a second request for IP address information from the second IAB-donor-CU (e.g., the IAB-donor 2-CU 1304/1404). For example, 1810 may be performed by the IP address information component 2348 in FIG. 23. FIG. 14 illustrates an example request for IP address information 1416.

At 1812, the first IAB-donor-CU may forward the second request for the IP address information to the third IAB-donor-CU (e.g., the IAB-donor 3-CU 1306/1406). For example, 1812 may be performed by the IP address information component 2348 in FIG. 23. FIG. 14 illustrates an example of forwarding a request for IP address information 1418.

At 1814, the first IAB-donor-CU may receive the IP address information from the third IAB-donor-CU (e.g., the IAB-donor 3-CU 1306/1406). For example, 1814 may be performed by the IP address information component 2348 in FIG. 23. FIG. 14 illustrates an example of reception of the IP address information, at 1420.

At 1816, the first IAB-donor-CU may forward the IP address information to the second IAB-donor-CU (e.g., the IAB-donor 2-CU 1304/1404). The first traffic may be routed based at least in part on the IP address information. For example, 1816 may be performed by the IP address information component 2348 in FIG. 23. The receiving and the forwarding of the IP address information may be based on the second request for the IP address information. FIG. 14 illustrates an example of the IAB-donor-CU 1402 forwarding the IP address information 1422.

The IP address information may include an IP address or an IP prefix. The IP address information may be anchored at an IAB-donor-DU associated with the third IAB-donor-CU (e.g., the IAB-donor 3-CU 1306/1406). The IP address information or the second request for the IP address information may indicate a usage.

At 1818, the first IAB-donor-CU may receive QoS mapping information from the third IAB-donor-CU (e.g., the IAB-donor 3-CU 1306/1406). For example, 1818 may be performed by the QoS mapping component 2350 in FIG. 23. At 1820, the first IAB-donor-CU may forward the QoS mapping information to the second IAB-donor-CU (e.g., the IAB-donor 2-CU 1304/1404). For example, 1820 may be performed by the QoS mapping component 2350 in FIG. 23. FIG. 14 illustrates an example of the IAB-donor 1 CU 1402 receiving the QoS mapping information 1424 and forwarding the QoS information, at 1426.

The QoS mapping information may include at least one of a DSCP value or an IP flow label value. Corresponding IP header fields of the first traffic rerouted via an IAB node associated with the third IAB-donor-CU (e.g., the IAB-donor 3-CU 1306/1406) may be set based on the QoS mapping information.

At 1822, the first IAB-donor-CU may receive a BAP configuration from one of the second IAB-donor-CU (e.g., the IAB-donor 2-CU 1304/1404) or the third IAB-donor-CU (e.g., the IAB-donor 3-CU 1306/1406). For example, 1822 may be performed by the BAP configuration component 2352 in FIG. 23. FIG. 14 illustrates an example of the IAB-donor 1 CU 1402 receiving the BAP configuration 1430a.

At 1824, the first IAB-donor-CU may configure a BAP route based on the BAP configuration to route at least one of the first traffic or the second traffic. For example, 1824 may be performed by the BAP configuration component 2352 in FIG. 23. FIG. 14 illustrates an example of the IAB-donor 1 CU 1402 configuring a BAP route, at 1432.

At 1826, the first IAB-donor-CU may forward the BAP configuration to the second IAB-donor-CU (e.g., the IAB-donor 2-CU 1304/1404) or the third IAB-donor-CU (e.g., the IAB-donor 3-CU 1306/1406) that did not transmit the BAP configuration. For example, 1826 may be performed by the BAP configuration component 2352 in FIG. 23. FIG. 14 illustrates an example of the IAB-donor 1 CU 1402 forwarding the BAP configuration, at 1434a.

The BAP configuration may include a BAP routing ID, a BAP destination address, or a BAP path ID. The BAP configuration may include an identifier of the second IAB-donor-CU (e.g., the IAB-donor 2-CU 1304/1404) or the third IAB-donor-CU (e.g., the IAB-donor 3-CU 1306/1406). Configuring the BAP route based on the BAP configuration to route at least one of the first traffic or the second traffic may include configuring the BAP route based on the BAP configuration to route at least one of the first traffic or the second traffic between the second IAB node (e.g., the IAB node 2 1316) and the third IAB node (e.g., the IAB node 2 1316).

At 1828, the first IAB-donor-CU may indicate, to the third IAB-donor-CU (e.g., the IAB-donor 3-CU 1306/1406), that at least part of the second traffic may be associated with the second IAB-donor-CU (e.g., the IAB-donor 2-CU 1304/1404). For example, 1828 may be performed by the indication component 2354 in FIG. 23. Finally, at 1830, the first IAB-donor-CU may indicate, to the second IAB-donor-CU (e.g., the IAB-donor 2-CU 1304/1404), that at least part of the first traffic may be rerouted via an IAB node associated with the third IAB-donor-CU (e.g., the IAB-donor 3-CU 1306/1406). For example, 1830 may be performed by the indication component 2354 in FIG. 23. FIG. 14 illustrates example indications 1436 and 1438.

In one aspect, the second IAB-donor-CU (e.g., the IAB-donor 2-CU 1304/1404) and the third IAB-donor-CU (e.g., the IAB-donor 3-CU 1306/1406) may be a same IAB-donor-CU.

Figure 19:
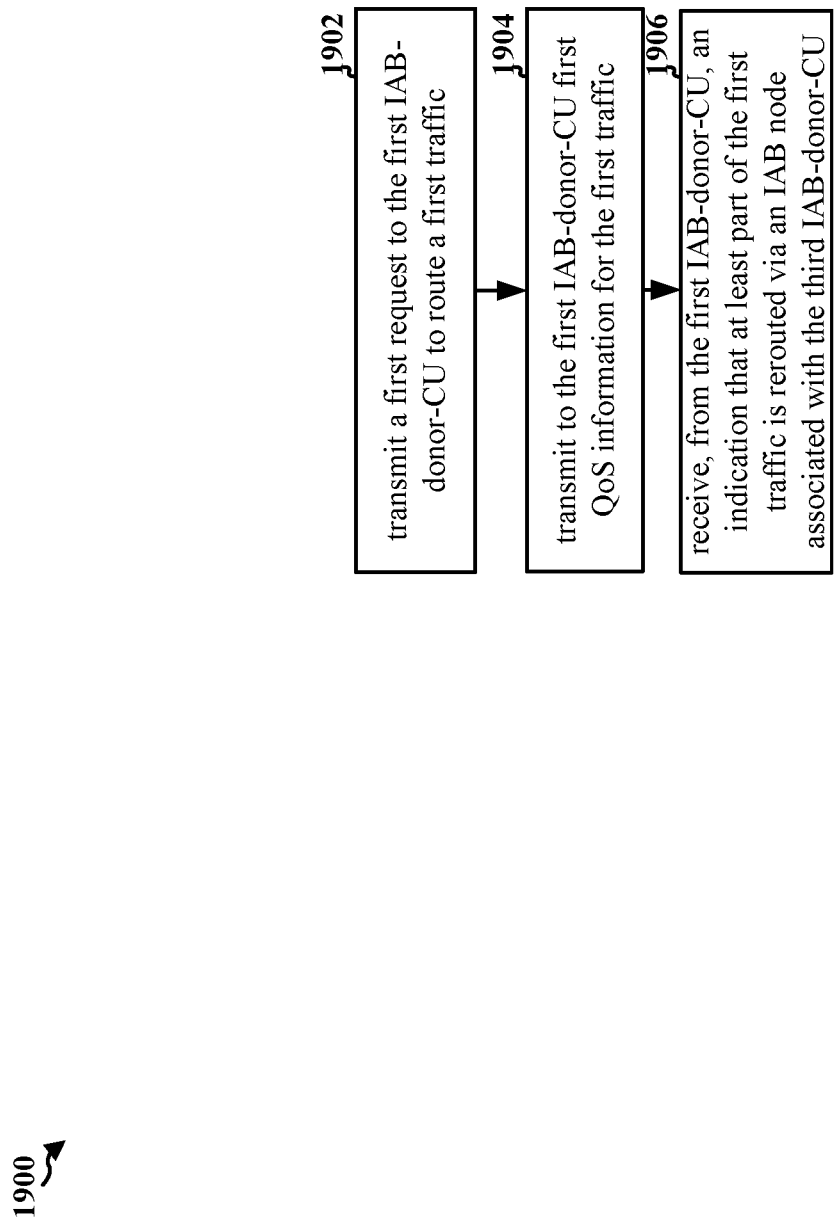
FIG. 19 is a flowchart of a method of wireless communication.

FIG. 19 is a flowchart 1900 of a method of wireless communication. The method may be performed by a second IAB-donor-CU (e.g., the IAB-donor-CU in the IAB-donor node 103; the IAB-donor 2-CU 1304/1404; the apparatus 2402).

At 1902, the second IAB-donor-CU may transmit a first request to the first IAB-donor-CU (e.g., the IAB-donor 1-CU 1302/1402) to route a first traffic between a first IAB node (e.g., the IAB node 3 1318) associated with the second IAB-donor-CU and a second IAB node (e.g., the IAB node 2 1316) associated with the first IAB-donor-CU (e.g., the IAB-donor 1-CU 1302/1402). For example, 1902 may be performed by the first traffic component 2440 in FIG. 24. The first request may relate to routing second traffic between a third IAB node (e.g., the IAB node 2 1316) associated with the first IAB-donor-CU (e.g., the IAB-donor 1-CU 1302/1402) and a fourth IAB node (e.g., the IAB-donor 3-DU 1312) associated with the third IAB-donor-CU (e.g., the IAB-donor 3-CU 1306/1406). Content of the second traffic may be at least partially based on the first traffic. FIG. 14 illustrates an example request 1408.

At 1904, the second IAB-donor-CU may transmit to the first IAB-donor-CU (e.g., the IAB-donor 1-CU 1302/1402) first QoS information for the first traffic. For example, 1904 may be performed by the first QoS component 2442 in FIG. 24. Second QoS information for the second traffic may be based at least in part on the first QoS information. FIG. 14 illustrates an example of the QoS information 1410.

At 1906, the second IAB-donor-CU may receive, from the first IAB-donor-CU (e.g., the IAB-donor 1-CU 1302/1402), an indication that at least part of the first traffic may be rerouted via an IAB node associated with the third IAB-donor-CU (e.g., the IAB-donor 3-CU 1306/1406). For example, 1906 may be performed by the indication component 2452 in FIG. 24. FIG. 14 illustrates an example indication 1436.

Figure 20:
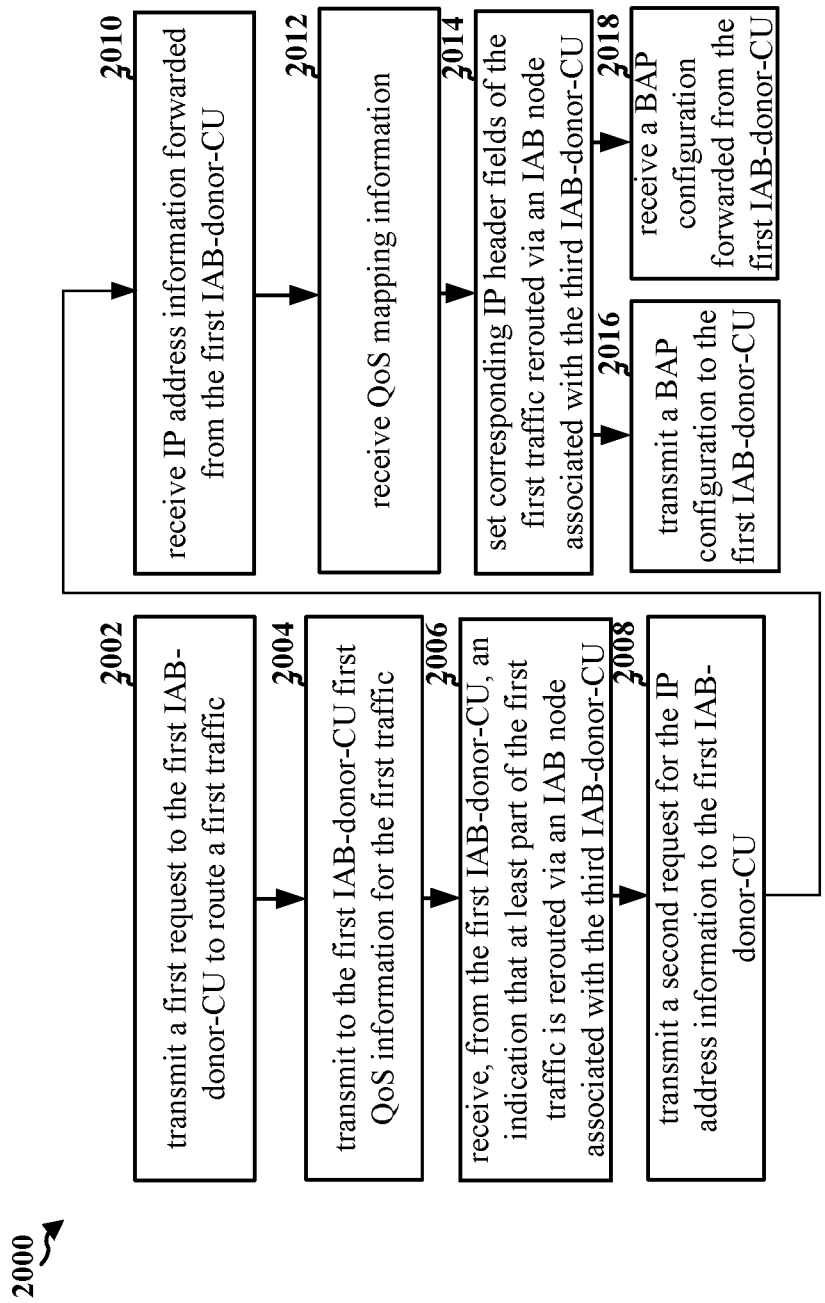
FIG. 20 is a flowchart of a method of wireless communication.

FIG. 20 is a flowchart 2000 of a method of wireless communication. The method may be performed by a second IAB-donor-CU (e.g., the IAB-donor-CU in the IAB-donor node 103; the IAB-donor 2-CU 1304/1404; the apparatus 2402).

At 2002, the second IAB-donor-CU may transmit a first request to the first IAB-donor-CU (e.g., the IAB-donor 1-CU 1302/1402) to route a first traffic between a first IAB node (e.g., the IAB node 3 1318) associated with the second IAB-donor-CU and a second IAB node (e.g., the IAB node 2 1316) associated with the first IAB-donor-CU (e.g., the IAB-donor 1-CU 1302/1402). For example, 2002 may be performed by the first traffic component 2440 in FIG. 24. The first request may relate to routing second traffic between a third IAB node (e.g., the IAB node 2 1316) associated with the first IAB-donor-CU (e.g., the IAB-donor 1-CU 1302/ 1402) and a fourth IAB node (e.g., the IAB-donor 3-DU 1312) associated with the third IAB-donor-CU (e.g., the IAB-donor 3-CU 1306/1406). Content of the second traffic may be at least partially based on the first traffic. FIG. 14 illustrates an example request 1408.

At 2004, the second IAB-donor-CU may transmit to the first IAB-donor-CU (e.g., the IAB-donor 1-CU 1302/1402) first QoS information for the first traffic. For example, 2004 may be performed by the first QoS component 2442 in FIG. 24. Second QoS information for the second traffic may be based at least in part on the first QoS information. FIG. 14 illustrates an example of the QoS information 1410.

At 2006, the second IAB-donor-CU may receive, from the first IAB-donor-CU (e.g., the IAB-donor 1-CU 1302/1402), an indication that at least part of the first traffic may be rerouted via an IAB node associated with the third IAB-donor-CU (e.g., the IAB-donor 3-CU 1306/1406). For example, 2006 may be performed by the indication component 2452 in FIG. 24. FIG. 14 illustrates an example indication 1436.

Each of the first QoS information and the second QoS information may be associated with at least one of a radio bearer of respective traffic, an F1-U tunnel of the respective traffic, a QoS flow of the respective traffic, or a backhaul RLC channel that may carry the respective traffic. In one aspect, the first QoS information may be specified at a same level of granularity as the second QoS information. In another aspect, the first QoS information is specified at a different level of granularity from the second QoS information.

In one aspect, the first IAB node (e.g., the IAB node 3 1318) may be associated with the second IAB-donor-CU via an RRC connection or an F1-C connection. The second and the third IAB nodes (e.g., the IAB node 2 1316) may be associated with the first IAB-donor-CU (e.g., the IAB-donor 1-CU 1302/1402) via a respective RRC connection or a respective F1-C connection. The fourth IAB node (e.g., the IAB-donor 3-DU 1312) may be associated with the third IAB-donor-CU (e.g., the IAB-donor 3-CU 1306/1406) via an RRC connection or an F1-C connection.

Each of the first IAB node or the fourth IAB node may be an IAB-donor node (e.g., an IAB-donor-DU). The second IAB node (e.g., the IAB node 2 1316) and the third IAB node (e.g., the IAB node 2 1316) may be a same node. Each of the first traffic and the second traffic may include one of an uplink traffic, a downlink traffic, or a bidirectional traffic.

At 2008, the second IAB-donor-CU may transmit a second request for the IP address information to the first IAB-donor-CU (e.g., the IAB-donor 1-CU 1302/1402) for forwarding to the third IAB-donor-CU (e.g., the IAB-donor 3-CU 1306/1406). For example, 2008 may be performed by the IP address information component 2444 in FIG. 24. FIG. 14 illustrates an example of the request for IP address information 1416. The IP address information may be received based on the second request for the IP address information.

At 2010, the second IAB-donor-CU may receive the IP address information forwarded from the first IAB-donor-CU (e.g., the IAB-donor 1-CU 1302/1402). FIG. 14 illustrates an example of the IP address information 1422. The IP address information may be forwarded from the third IAB-donor-CU (e.g., the IAB-donor 3-CU 1306/1406) by the first IAB-donor-CU (e.g., the IAB-donor 1-CU 1302/1402). The first traffic may be routed based at least in part on the IP address information. For example, 2010 may be performed by the IP address information component 2444 in FIG. 24.

The IP address information may include an IP address or an IP prefix. The IP address information may be anchored at an IAB-donor-DU associated with the third IAB-donor-CU (e.g., the IAB-donor 3-CU 1306/1406). The IP address information or the second request for the IP address information may indicate a usage.

At 2012, the second IAB-donor-CU may receive QoS mapping information that is received from the third IAB-donor-CU (e.g., the IAB-donor 3-CU 1306/1406) by the first IAB-donor-CU (e.g., the IAB-donor 1-CU 1302/1402). For example, 2012 may be performed by the QoS mapping component 2446 in FIG. 24. FIG. 14 illustrates an example of the QoS mapping information 1426. The QoS mapping information may include at least one of a DSCP value or an IP flow label value.

At 2014, the second IAB-donor-CU may set corresponding IP header fields of the first traffic rerouted via an IAB node associated with the third IAB-donor-CU (e.g., the IAB-donor 3-CU 1306/1406) based on the QoS mapping information. For example, 2014 may be performed by the IP header component 2448 in FIG. 24. FIG. 14 illustrates an example of the IAB-donor 2-CU setting the corresponding IP header fields, at 1428.

Finally, where the first traffic or the second traffic includes downlink traffic, at 2016, the second IAB-donor-CU may transmit a BAP configuration to the first IAB-donor-CU (e.g., the IAB-donor 1-CU 1302/1402) for forwarding to the third IAB-donor-CU (e.g., the IAB-donor 3-CU 1306/1406). A BAP route may be configured based on the BAP configuration to route at least one of the first traffic or the second traffic. For example, 2016 may be performed by the BAP configuration component 2450 in FIG. 24. FIG. 14 illustrates an example of the IAB-donor 2-CU transmitting a BAP configuration 1430a. The BAP configuration may include a BAP routing ID, a BAP destination address, or a BAP path ID. The BAP configuration may include an identifier of the second IAB-donor-CU. The BAP route may be configured based on the BAP configuration to route at least one of the first traffic or the second traffic between the second IAB node (e.g., the IAB node 2 1316) and the third IAB node (e.g., the IAB node 2 1316).

In another aspect where the first traffic or the second traffic includes uplink traffic, at 2018, the second IAB-donor-CU may receive a BAP configuration forwarded from the first IAB-donor-CU (e.g., the IAB-donor 1-CU 1302/ 1402). A BAP route may be configured based on the BAP configuration to route at least one of the first traffic or the second traffic. The BAP configuration may be received from the third IAB-donor-CU (e.g., the IAB-donor 3-CU 1306/ 1406) via the first IAB-donor-CU (e.g., the IAB-donor 1-CU 1302/1402). For example, 2018 may be performed by the BAP configuration component 2450 in FIG. 24. FIG. 14 illustrates an example of the IAB-donor 2-CU receiving a forwarded BAP configuration 1434b.

In one aspect, the second IAB-donor-CU and the third IAB-donor-CU (e.g., the IAB-donor 3-CU 1306/1406) may be a same IAB-donor-CU, e.g., such as described in connection with FIGS. 15 and 16.

Figure 21:
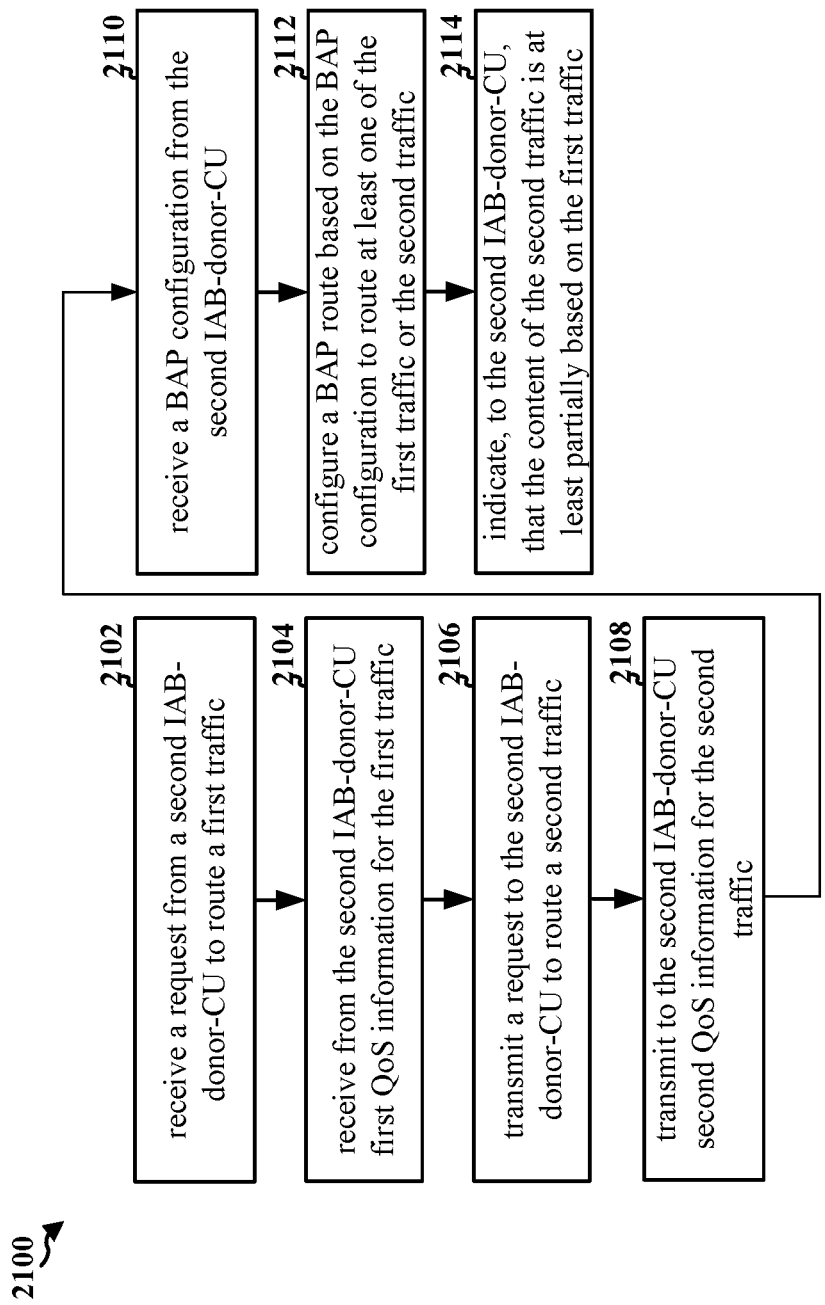
FIG. 21 is a flowchart of a method of wireless communication.

FIG. 21 is a flowchart 2100 of a method of wireless communication. The method may be performed by a first IAB-donor-CU (e.g., the IAB-donor-CU in the IAB-donor node 103; the IAB-donor 1-CU 1502/1602; the apparatus 2302).

At 2102, the first IAB-donor-CU may receive a request from a second IAB-donor-CU (e.g., the IAB-donor 2-CU

1504/1604) to route a first traffic between a first IAB node (e.g., the IAB node 3 1514) associated with the second IAB-donor-CU (e.g., the IAB-donor 2-CU 1504/1604) and a second IAB node (e.g., the IAB node 2 1512) associated with the first IAB-donor-CU. For example, 2102 may be performed by the first traffic component 2340 in FIG. 23. FIG. 16 illustrates an example of the IAB-donor 1-CU receiving from the IAB-donor 2-CU a request to route a first traffic 1606.

At 2104, the first IAB-donor-CU may receive from the second IAB-donor-CU (e.g., the IAB-donor 2-CU 1504/1604) first QoS information for the first traffic. For example, 2104 may be performed by the first QoS component 2342 in FIG. 23. FIG. 16 illustrates an example of the IAB-donor 1-CU receiving from the IAB-donor 2-CU first QoS information for the first traffic 1608.

At 2106, the first IAB-donor-CU may transmit a request to the second IAB-donor-CU (e.g., the IAB-donor 2-CU 1504/1604) to route a second traffic between a third IAB node (e.g., the IAB node 2 1512) associated with the first IAB-donor-CU and a fourth IAB node (e.g., the IAB-donor 2-DU 1508) associated with the second IAB-donor-CU (e.g., the IAB-donor 2-CU 1504/1604). At least a part of content of the second traffic may be based on the first traffic. For example, 2106 may be performed by the second traffic component 2344 in FIG. 23. FIG. 16 illustrates an example of the IAB-donor 1-CU transmitting to the IAB-donor 2-CU a request to route a second traffic 1610.

At 2108, the first IAB-donor-CU may transmit to the second IAB-donor-CU (e.g., the IAB-donor 2-CU 1504/1604) second QoS information for the second traffic. The second QoS information may be based at least in part on the first QoS information. For example, 2108 may be performed by the second QoS component 2346 in FIG. 23. In one aspect, the second QoS information may be provided by the first IAB-donor-CU implicitly, and the second traffic may be routed based at least in part on the first QoS information for the first traffic. FIG. 16 illustrates an example of the IAB-donor 1-CU transmitting to the IAB-donor 2-CU second QoS information for the second traffic 1612.

At 2110, the first IAB-donor-CU may receive a BAP configuration from the second IAB-donor-CU (e.g., the IAB-donor 2-CU 1504/1604). For example, 2110 may be performed by the BAP configuration component 2352 in FIG. 23. FIG. 16 illustrates an example of the IAB-donor 1-CU receiving from the IAB-donor 2-CU a BAP configuration 1614.

At 2112, the first IAB-donor-CU may configure a BAP route based on the BAP configuration to route at least one of the first traffic or the second traffic. For example, 2112 may be performed by the BAP configuration component 2352 in FIG. 23. The first IAB-donor-CU may refrain from further forwarding the BAP configuration. FIG. 16 illustrates an example of the IAB-donor 1-CU configurating a BAP route, at 1616.

Finally, at 2114, the first IAB-donor-CU may indicate, to the second IAB-donor-CU (e.g., the IAB-donor 2-CU 1504/1604), that the content of the second traffic is at least partially based on the first traffic. For example, 2114 may be performed by the indication component 2354 in FIG. 23. FIG. 16 illustrates an example of the IAB-donor 1-CU indicating to the IAB-donor 2-CU that the content of the second traffic is at least partially based on the first traffic, at 1618.

Figure 22:
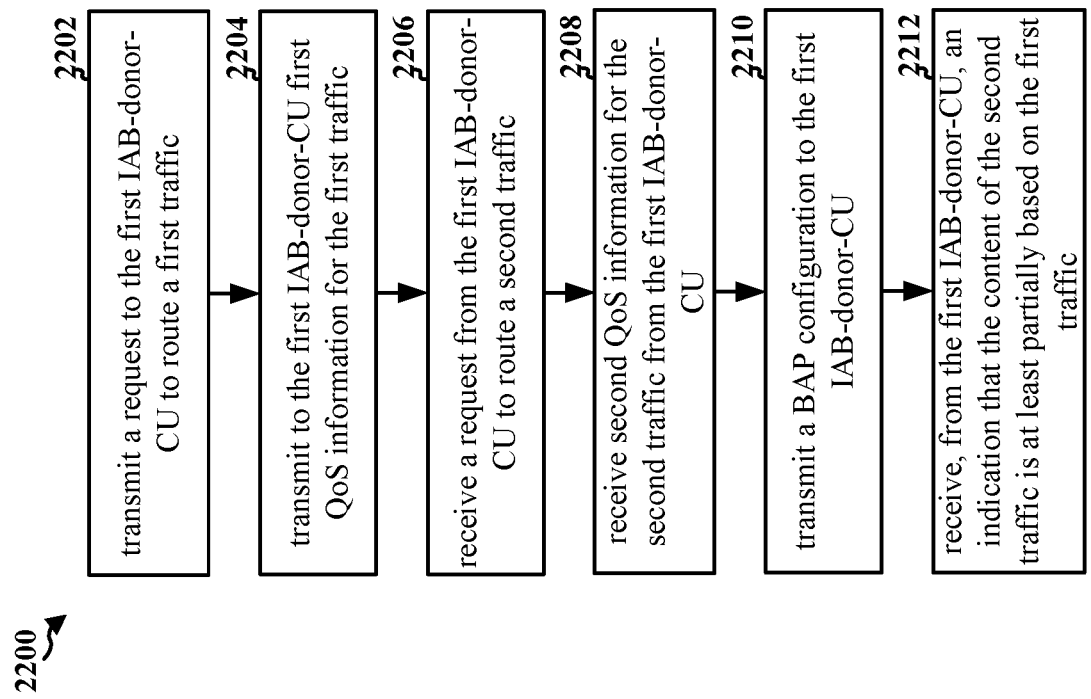
FIG. 22 is a flowchart of a method of wireless communication.

FIG. 22 is a flowchart 2200 of a method of wireless communication. The method may be performed by a second IAB-donor-CU (e.g., the IAB-donor-CU in the IAB-donor node 103; the IAB-donor 2-CU 1504/1604; the apparatus 2402).

At 2202, the second IAB-donor-CU may transmit a request to the first IAB-donor-CU (e.g., the IAB-donor 1-CU 1502/1602) to route a first traffic between a first IAB node (e.g., the IAB node 3 1514) associated with the second IAB-donor-CU and a second IAB node (e.g., the IAB node 2 1512) associated with the first IAB-donor-CU (e.g., the IAB-donor 1-CU 1502/1602). The request may relate to routing second traffic between a third IAB node (e.g., the IAB node 2 1512) associated with the first IAB-donor-CU (e.g., the IAB-donor 1-CU 1502/1602) and a fourth IAB node (e.g., the IAB-donor 2-DU 1508) associated with the second IAB-donor-CU. Content of the second traffic may be at least partially based on the first traffic. For example, 2202 may be performed by the first traffic component 2440 in FIG. 24. FIG. 16 illustrates an example of the IAB-donor 2-CU transmitting to the IAB-donor 1 CU a request to route a first traffic 1606.

At 2204, the second IAB-donor-CU may transmit to the first IAB-donor-CU (e.g., the IAB-donor 1-CU 1502/1602) first QoS information for the first traffic. Second QoS information for the second traffic may be based at least in part on the first QoS information. For example, 2204 may be performed by the first QoS component 2442 in FIG. 24. The second QoS information for the second traffic may be implicitly indicated to the second IAB-donor-CU by the first IAB-donor-CU (e.g., the IAB-donor 1-CU 1502/1602), and the second traffic may be routed based at least in part on the first QoS information for the first traffic. FIG. 16 illustrates an example of the IAB-donor 2-CU transmitting to the IAB-donor 1-CU first QoS information for the first traffic 1608.

At 2206, the second IAB-donor-CU may receive a request from the first IAB-donor-CU (e.g., the IAB-donor 1-CU 1502/1602) to route a second traffic. For example, 2206 may be performed by the second traffic/QoS component 2454 in FIG. 24. FIG. 16 illustrates an example of the IAB-donor 2-CU receiving from the IAB-donor 1-CU a request to route a second traffic 1610.

At 2208, the second IAB-donor-CU may receive second QoS information for the second traffic from the first IAB-donor-CU (e.g., the IAB-donor 1-CU 1502/1602). For example, 2208 may be performed by the second traffic/QoS component 2454 in FIG. 24. FIG. 16 illustrates an example of the IAB-donor 2-CU receiving from the IAB-donor 1-CU second QoS information for the second traffic 1612.

At 2210, the second IAB-donor-CU may transmit a BAP configuration to the first IAB-donor-CU (e.g., the IAB-donor 1-CU 1502/1602). A BAP route may be configured based on the BAP configuration to route at least one of the first traffic or the second traffic. For example, 2210 may be performed by the BAP configuration component 2450 in FIG. 24. The second IAB-donor-CU may not receive the BAP configuration forwarded from the first IAB-donor-CU (e.g., the IAB-donor 1-CU 1502/1602). FIG. 16 illustrates an example of the IAB-donor 2-CU transmitting to the IAB-donor 1-CU a BAP configuration 1614.

At 2212, the second IAB-donor-CU may receive, from the first IAB-donor-CU (e.g., the IAB-donor 1-CU 1502/1602), an indication that the content of the second traffic may be at least partially based on the first traffic. For example, 2212 may be performed by the indication component 2452 in FIG. 24. FIG. 16 illustrates an example of the IAB-donor 2-CU receiving from the IAB-donor 1-CU an indication that the content of the second traffic may be at least partially based on the first traffic, at 1618.

Figure 23:
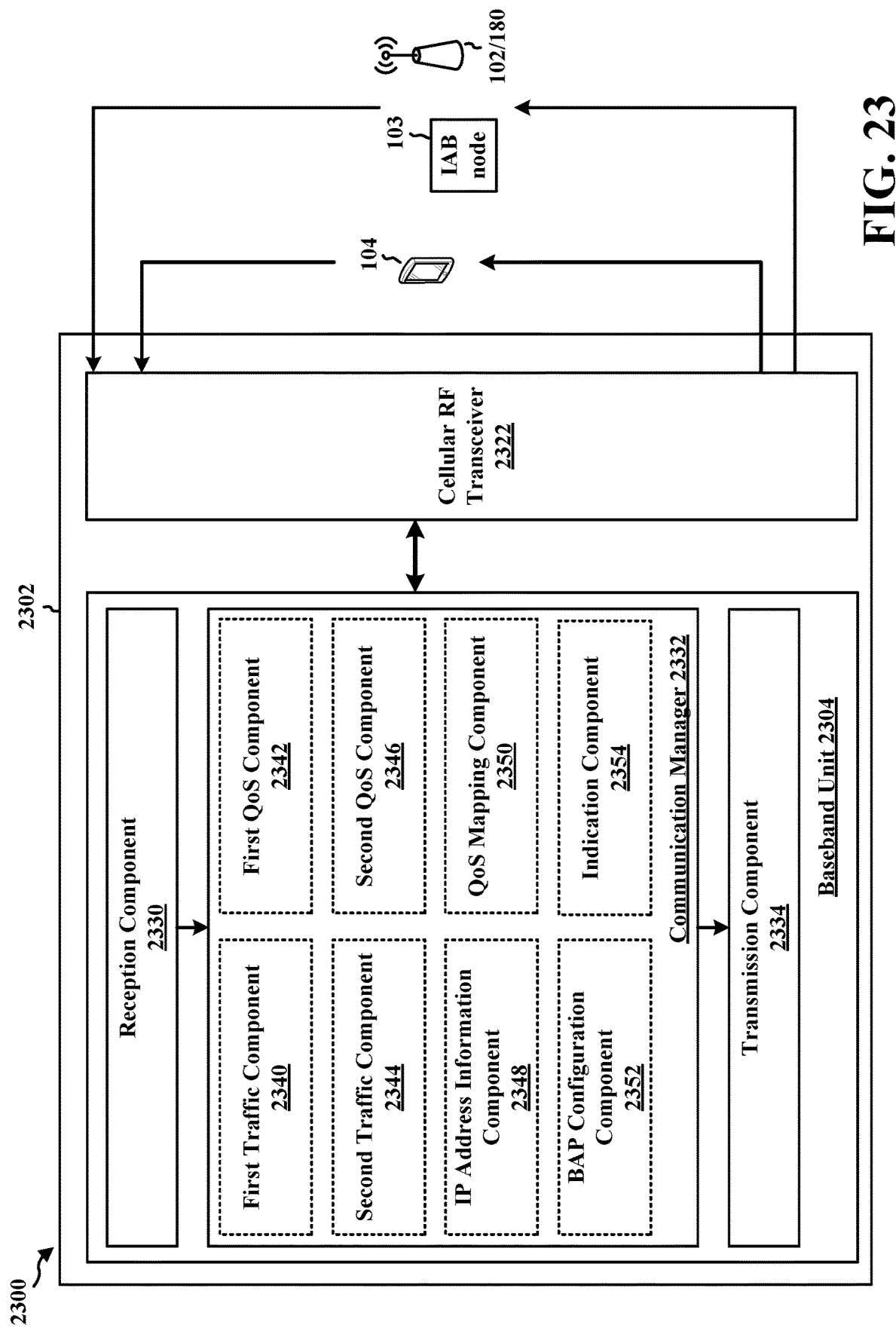
FIG. 23 is a diagram illustrating an example of a hardware implementation for an example apparatus.

FIG. 23 is a diagram 2300 illustrating an example of a hardware implementation for an apparatus 2302. The apparatus 2302 may be a base station, a component of a base station, or may implement base station functionality. In some aspects, the apparatus 2302 may include a baseband unit 2304. The baseband unit 2304 may communicate through a cellular RF transceiver 2322 with the UE 104. The baseband unit 2304 may include a computer-readable medium/memory. The baseband unit 2304 is responsible for general processing, including the execution of software stored on the computer-readable medium/memory. The software, when executed by the baseband unit 2304, causes the baseband unit 2304 to perform the various functions described supra. The computer-readable medium/memory may also be used for storing data that is manipulated by the baseband unit 2304 when executing software. The baseband unit 2304 further includes a reception component 2330, a communication manager 2332, and a transmission component 2334. The communication manager 2332 includes the one or more illustrated components. The components within the communication manager 2332 may be stored in the computer-readable medium/memory and/or configured as hardware within the baseband unit 2304. The baseband unit 2304 may be a component of the base station 310 and may include the memory 376 and/or at least one of the TX processor 316, the RX processor 370, and the controller/processor 375.

The communication manager 2332 includes a first traffic component 2340 that is configured to receive a first request from a second IAB-donor-CU to route a first traffic between a first IAB node associated with the second IAB-donor-CU and a second IAB node associated with the first IAB-donor-CU, e.g., as described in connection with 1702. The communication manager 2332 further includes a first QoS component 2342 that is configured to receive from the second IAB-donor-CU first QoS information for the first traffic, e.g., as described in connection with 1704. The communication manager 2332 further includes a second traffic component 2344 that is configured to transmit a request to a third IAB-donor-CU to route a second traffic between a third IAB node associated with the first IAB-donor-CU and a fourth IAB node associated with the third IAB-donor-CU, where at least a part of content of the second traffic is based on the first traffic, e.g., as described in connection with 1706.

The apparatus may include additional components that perform each of the blocks of the algorithm in the flowcharts of FIGS. 17, 18, and 21. As such, each block in the flowcharts of FIGS. 17, 18, and 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2302 may include a variety of components configured for various functions. In one configuration, the apparatus 2302, and in particular the baseband unit 2304, includes means for receiving a first request from a second IAB-donor-CU to route a first traffic between a first IAB node associated with the second IAB-donor-CU and a second IAB node associated with the first IAB-donor-CU. The apparatus 2302, and in particular the baseband unit 2304, includes means for receiving from the second IAB-donor-CU first QoS information for the first traffic. The apparatus 2302, and in particular the baseband unit 2304, includes means for transmitting a request to a third IAB-donor-CU to route a second traffic between a third IAB node associated with the first IAB-donor-CU and a fourth IAB node associated with the third IAB-donor-CU. At least a part of content of the second traffic may be based on the first traffic. The means may be one or more of the components of the apparatus 2302 configured to perform the functions recited by the means. As described supra, the apparatus 2302 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 24:
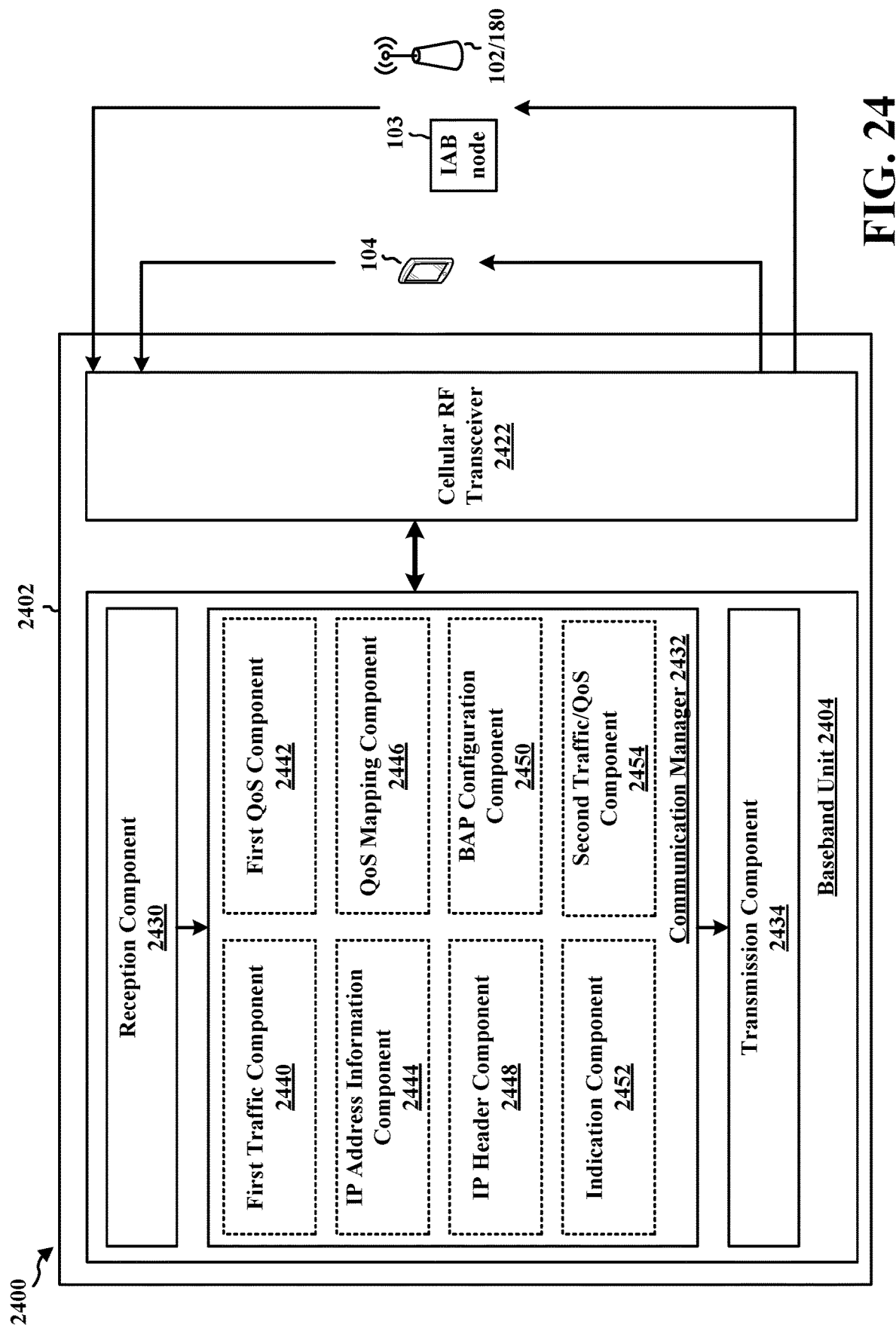
FIG. 24 is a diagram illustrating an example of a hardware implementation for an example apparatus.

FIG. 24 is a diagram 2400 illustrating an example of a hardware implementation for an apparatus 2402. The apparatus 2402 may be a base station, a component of a base station, or may implement base station functionality. In some aspects, the apparatus 2402 may include a baseband unit 2404. The baseband unit 2404 may communicate through a cellular RF transceiver 2422 with the UE 104. The baseband unit 2404 may include a computer-readable medium/memory. The baseband unit 2404 is responsible for general processing, including the execution of software stored on the computer-readable medium/memory. The software, when executed by the baseband unit 2404, causes the baseband unit 2404 to perform the various functions described supra. The computer-readable medium/memory may also be used for storing data that is manipulated by the baseband unit 2404 when executing software. The baseband unit 2404 further includes a reception component 2430, a communication manager 2432, and a transmission component 2434. The communication manager 2432 includes the one or more illustrated components. The components within the communication manager 2432 may be stored in the computer-readable medium/memory and/or configured as hardware within the baseband unit 2404. The baseband unit 2404 may be a component of the base station 310 and may include the memory 376 and/or at least one of the TX processor 316, the RX processor 370, and the controller/processor 375.

The communication manager 2432 includes a first traffic component 2440 that is configured to transmit a first request to a first IAB-donor-CU to route a first traffic between a first IAB node associated with a second IAB-donor-CU and a second IAB node associated with the first IAB-donor-CU, where the first request relates to routing second traffic between a third IAB node associated with the first IAB-donor-CU and a fourth IAB node associated with a third IAB-donor-CU, and where content of the second traffic is at least partially based on the first traffic, e.g., as described in connection with 1802. The communication manager 2432 further includes a first QoS component 2442 that is configured to transmit to the first IAB-donor-CU first QoS information for the first traffic, where second QoS information for the second traffic is based at least in part on the first QoS information, e.g., as described in connection with 1804. The communication manager 2432 further includes an indication component 2452 that is configured to receive, from the first IAB-donor-CU, an indication that at least part of the first traffic is rerouted via an IAB node associated with the third IAB-donor-CU, e.g., as described in connection with 1806.

The apparatus may include additional components that perform each of the blocks of the algorithm in the flowcharts of FIGS. 19, 20, and 22. As such, each block in the flowcharts of FIGS. 19, 20, and 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2402 may include a variety of components configured for various functions. In one configuration, the apparatus 2402, and in particular the baseband unit 2404, includes means for transmitting a first request to a first IAB-donor-CU to route a first traffic between a first IAB node associated with a second IAB-donor-CU and a second IAB node associated with the first IAB-donor-CU. The first request may relate to routing second traffic between a third IAB node associated with the first IAB-donor-CU and a fourth IAB node associated with a third IAB-donor-CU. Content of the second traffic may be at least partially based on the first traffic. The apparatus 2402, and in particular the baseband unit 2404, includes means for transmitting to the first IAB-donor-CU first QoS information for the first traffic. Second QoS information for the second traffic may be based at least in part on the first QoS information. The apparatus 2402, and in particular the baseband unit 2404, includes means for receiving, from the first IAB-donor-CU, an indication that at least part of the first traffic is rerouted via an IAB node associated with the third IAB-donor-CU. The means may be one or more of the components of the apparatus 2402 configured to perform the functions recited by the means. As described supra, the apparatus 2402 may include the TX Processor 316, the RX Processor 370, and the controller/processor 375. As such, in one configuration, the means may be the TX Processor 316, the RX Processor 370, and the controller/processor 375 configured to perform the functions recited by the means.

Therefore, aspects relate to reception, processing, and forwarding of appropriate information between IAB-donor-CUs to enable inter-topology BAP routing where three or more topologies are present. Through the forwarding of QoS information, IP address information, QoS mapping information, BAP configurations, etc., and the provision of useful indications between the IAB-donor-CUs, inter-topology BAP routing with QoS support in scenarios where three or more topologies are present may be achieved. Accordingly, traffic may be flexibly offloaded between the topologies for load balancing or congestion avoidance purposes.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a is an apparatus for wireless communication at a first IAB-donor-CU including at least one processor coupled to a memory and configured to: receive a first request from a second IAB-donor-CU to route a first traffic between a first IAB node associated with the second IAB-donor-CU and a second IAB node associated with the first IAB-donor-CU; receive from the second IAB-donor-CU first QoS information for the first traffic; and transmit a request to a third IAB-donor-CU to route a second traffic between a third IAB node associated with the first IAB-donor-CU and a fourth IAB node associated with the third IAB-donor-CU, where at least a part of content of the second traffic is based on the first traffic.

Aspect 2 is the apparatus of aspect 1, the at least one processor being further configured to: transmit to the third IAB-donor-CU second QoS information for the second traffic, where the second QoS information is based at least in part on the first QoS information.

Aspect 3 is the apparatus of aspect 2, where each of the first QoS information and the second QoS information is associated with at least one of: a radio bearer of respective traffic; an F1-U tunnel of the respective traffic; a QoS flow of the respective traffic; or a backhaul RLC channel that carries the respective traffic.

Aspect 4 is the apparatus of any of aspects 2 and 3, where the first QoS information is specified at a same level of granularity as the second QoS information.

Aspect 5 is the apparatus of any of aspects 2 and 3, where the first QoS information is specified at a different level of granularity from the second QoS information.

Aspect 6 is the apparatus of any of aspects 1 to 5, where the first IAB node is associated with the second IAB-donor-CU via an RRC connection or an F1-C connection, the second and the third IAB nodes are associated with the first IAB-donor-CU via a respective RRC connection or a respective F1-C connection, and the fourth IAB node is associated with the third IAB-donor-CU via an RRC connection or an F1-C connection.

Aspect 7 is the apparatus of any of aspects 1 to 6, where the first IAB node is an IAB-donor node.

Aspect 8 is the apparatus of any of aspects 1 to 7, where the fourth IAB node is an IAB-donor node.

Aspect 9 is the apparatus of any of aspects 1 to 8, where the second IAB node and the third IAB node are a same node.

Aspect 10 is the apparatus of any of aspects 1 to 9, where each of the first traffic and the second traffic includes one of: an uplink traffic, a downlink traffic, or a bidirectional traffic.

Aspect 11 is the apparatus of any of aspects 1 to 10, the at least one processor being further configured to: receive IP address information from the third IAB-donor-CU; and forward the IP address information to the second IAB-donor-CU, where the first traffic is routed based at least in part on the IP address information.

Aspect 12 is the apparatus of aspect 11, where the IP address information includes an IP address or an IP prefix.

Aspect 13 is the apparatus of any of aspects 11 and 12, where the IP address information is anchored at an IAB-donor-DU associated with the third IAB-donor-CU.

Aspect 14 is the apparatus of any of aspects 11 to 13, the at least one processor being further configured to: receive a second request for the IP address information from the second IAB-donor-CU; and forward the second request for the IP address information to the third IAB-donor-CU, where the IP address information is received and forwarded based on the second request for the IP address information.

Aspect 15 is the apparatus of aspect 14, where the IP address information or the second request for the IP address information indicates a usage.

Aspect 16 is the apparatus of any of aspects 1 to 15, the at least one processor being further configured to: receive QoS mapping information from the third IAB-donor-CU; and forward the QoS mapping information to the second IAB-donor-CU.

Aspect 17 is the apparatus of aspect 16, where the QoS mapping information includes at least one of a DSCP value or an IP flow label value.

Aspect 18 is the apparatus of any of aspects 16 and 17, where corresponding IP header fields of the first traffic rerouted via an IAB node associated with the third IAB-donor-CU are set based on the QoS mapping information.

Aspect 19 is the apparatus of any of aspects 1 to 18, the at least one processor being further configured to: receive a BAP configuration from one of the second IAB-donor-CU or the third IAB-donor-CU; configure a BAP route based on the BAP configuration to route at least one of the first traffic or the second traffic; and forward the BAP configuration to the other of the second IAB-donor-CU or the third IAB-donor-CU that did not transmit the BAP configuration.

Aspect 20 is the apparatus of aspect 19, where the BAP configuration includes a BAP routing ID, a BAP destination address, or a BAP path ID.

Aspect 21 is the apparatus of any of aspects 19 and 20, where the BAP configuration includes an identifier of the second IAB-donor-CU or the third IAB-donor-CU.

Aspect 22 is the apparatus of any of aspects 19 to 21, where the at least one processor being configured to configure the BAP route based on the BAP configuration to route at least one of the first traffic or the second traffic is further configured to configure the BAP route based on the BAP configuration to route at least one of the first traffic or the second traffic between the second IAB node and the third IAB node.

Aspect 23 is the apparatus of any of aspects 1 to 22, the at least one processor being further configured to: indicate, to the third IAB-donor-CU, that at least part of the second traffic is associated with the second IAB-donor-CU.

Aspect 24 is the apparatus of any of aspects 1 to 23, the at least one processor being further configured to: indicate, to the second IAB-donor-CU, that at least part of the first traffic is rerouted via an IAB node associated with the third IAB-donor-CU.

Aspect 25 is the apparatus of any of aspects 1 to 24, where the second IAB-donor-CU and the third IAB-donor-CU are a same IAB-donor-CU.

Aspect 26 is the apparatus of aspect 25, the at least one processor being further configured to: indicate, to the second IAB-donor-CU, that the content of the second traffic is at least partially based on the first traffic.

Aspect 27 is the apparatus of aspect 26, where the second traffic is routed based at least in part on the first QoS information for the first traffic.

Aspect 28 is the apparatus of any of aspects 25 to 27, the at least one processor being further configured to: receive a BAP configuration from the second IAB-donor-CU; configure a BAP route based on the BAP configuration to route at least one of the first traffic or the second traffic; and refrain from further forwarding the BAP configuration.

Aspect 29 is an apparatus of any of aspects 1 to 28, further including a transceiver coupled to the at least one processor.

Aspect 30 is an apparatus for wireless communication at a second IAB-donor-CU including at least one processor coupled to a memory and configured to: transmit a first request to a first IAB-donor-CU to route a first traffic between a first IAB node associated with the second IAB-donor-CU and a second IAB node associated with the first IAB-donor-CU, where the first request relates to routing second traffic between a third IAB node associated with the first IAB-donor-CU and a fourth IAB node associated with a third IAB-donor-CU, and content of the second traffic is at least partially based on the first traffic; transmit to the first IAB-donor-CU first QoS information for the first traffic, where second QoS information for the second traffic is based at least in part on the first QoS information; and receive, from the first IAB-donor-CU, an indication that at least part of the first traffic is rerouted via an IAB node associated with the third IAB-donor-CU.

Aspect 31 is the apparatus of aspect 30, where each of the first QoS information and the second QoS information is associated with at least one of: a radio bearer of respective traffic; an F1-U tunnel of the respective traffic; a QoS flow of the respective traffic; or a backhaul RLC channel that carries the respective traffic.

Aspect 32 is the apparatus of any of aspects 30 and 31, where the first QoS information is specified at a same level of granularity as the second QoS information.

Aspect 33 is the apparatus of any of aspects 30 and 31, where the first QoS information is specified at a different level of granularity from the second QoS information.

Aspect 34 is the apparatus of any of aspects 30 to 33, where the first IAB node is associated with the second IAB-donor-CU via an RRC connection or an F1-C connection, the second and the third IAB nodes are associated with the first IAB-donor-CU via a respective RRC connection or a respective F1-C connection, and the fourth IAB node is associated with the third IAB-donor-CU via an RRC connection or an F1-C connection.

Aspect 35 is the apparatus of any of aspects 30 to 34, where the first IAB node is an IAB-donor node.

Aspect 36 is the apparatus of any of aspects aspect 30 to 35, where the fourth IAB node is an IAB-donor node.

Aspect 37 is the apparatus of any of aspects aspect 30 to 36, where the second IAB node and the third IAB node are a same node.

Aspect 38 is the apparatus of any of aspects 30 to 37, where each of the first traffic and the second traffic includes one of: an uplink traffic, a downlink traffic, or a bidirectional traffic.

Aspect 39 is the apparatus of any of aspects 30 to 38, the at least one processor being further configured to: receive, at the second IAB-donor-CU, IP address information forwarded from the first IAB-donor-CU, where the IP address information is forwarded from the third IAB-donor-CU by the first IAB-donor-CU, and the first traffic is routed based at least in part on the IP address information.

Aspect 40 is the apparatus of aspect 39, where the IP address information includes an IP address or an IP prefix.

Aspect 41 is the apparatus of any of aspects 39 and 40, where the IP address information is anchored at an IAB-donor-DU associated with the third IAB-donor-CU.

Aspect 42 is the apparatus of any of aspects 39 to 41, the at least one processor being further configured to: transmit a second request for the IP address information to the first IAB-donor-CU for forwarding to the third IAB-donor-CU, where the IP address information is received based on the second request for the IP address information.

Aspect 43 is the apparatus of aspect 42, where the IP address information or the second request for the IP address information indicates a usage.

Aspect 44 is the apparatus of any of aspects 30 to 43, the at least one processor being further configured to: receive, at the second IAB-donor-CU, QoS mapping information that is received from the third IAB-donor-CU by the first IAB-donor-CU.

Aspect 45 is the apparatus of aspect 44, where the QoS mapping information includes at least one of a DSCP value or an IP flow label value.

Aspect 46 is the apparatus of any of aspects 44 and 45, the at least one processor being further configured to: set corresponding IP header fields of the first traffic rerouted via an IAB node associated with the third IAB-donor-CU based on the QoS mapping information.

Aspect 47 is the apparatus of any of aspects 30 to 46, the at least one processor being further configured to: transmit a BAP configuration to the first IAB-donor-CU for forwarding to the third IAB-donor-CU, where a BAP route is configured based on the BAP configuration to route at least one of the first traffic or the second traffic.

Aspect 48 is the apparatus of aspect 47, where the BAP configuration includes a BAP routing ID, a BAP destination address, or a BAP path ID.

Aspect 49 is the apparatus of any of aspects 47 and 48, where the BAP configuration includes an identifier of the second IAB-donor-CU.

Aspect 50 is the apparatus of any of aspects 47 to 49, where the BAP route is configured based on the BAP configuration to route at least one of the first traffic or the second traffic between the second IAB node and the third IAB node.

Aspect 51 is the apparatus of any of aspects 30 to 50, the at least one processor being further configured to: receive a BAP configuration forwarded from the first IAB-donor-CU, where a BAP route is configured based on the BAP configuration to route at least one of the first traffic or the second traffic, and the BAP configuration is received from the third IAB-donor-CU via the first IAB-donor-CU.

Aspect 52 is the apparatus of any of aspects 30 to 51, where the second IAB-donor-CU and the third IAB-donor-CU are a same IAB-donor-CU.

Aspect 53 is the apparatus of aspect 52, the at least one processor being further configured to: receive, from the first IAB-donor-CU, an indication that the content of the second traffic is at least partially based on the first traffic.

Aspect 54 is the apparatus of aspect 53, where the second traffic is routed based at least in part on the first QoS information for the first traffic.

Aspect 55 is the apparatus of any of aspects 52 to 54, the at least one processor being further configured to: transmit a BAP configuration to the first IAB-donor-CU, where a BAP route is configured based on the BAP configuration to route at least one of the first traffic or the second traffic, and the second IAB-donor-CU does not receive the BAP configuration forwarded from the first IAB-donor-CU.

Aspect 56 is an apparatus of any of aspects 30 to 55, further including a transceiver coupled to the at least one processor.

Aspect 57 is a method of wireless communication for implementing any of aspects 1 to 56.

Aspect 58 is an apparatus for wireless communication including means for implementing any of aspects 1 to 56.

Aspect 59 is a computer-readable medium storing computer executable code, where the code when executed by a processor causes the processor to implement any of aspects 1 to 56.

What is claimed is:

1. An apparatus for wireless communication at a first integrated access and backhaul (IAB) donor central unit (IAB-donor-CU), comprising:
 a memory; and
 at least one processor coupled to the memory and configured to:
  receive a first request from a second IAB-donor-CU to route a first traffic between a first IAB node associated with the second IAB-donor-CU and a second IAB node associated with the first IAB-donor-CU;
  receive, from the second IAB-donor-CU, first quality of service (QoS) information for the first traffic; and
  transmit a request to a third IAB-donor-CU to route a second traffic between a third IAB node associated with the first IAB-donor-CU and a fourth IAB node associated with the third IAB-donor-CU, wherein at least a part of content of the second traffic is based on the first traffic.

2. The apparatus of claim 1, the at least one processor being further configured to:
 transmit, to the third IAB-donor-CU, second QoS information for the second traffic, wherein the second QoS information is based at least in part on the first QoS information.

3. The apparatus of claim 2, wherein each of the first QoS information and the second QoS information is associated with at least one of:
 a radio bearer of respective traffic;
 an F1 user plane (F1-U) tunnel of the respective traffic;
 a QoS flow of the respective traffic; or
 a backhaul radio link control (RLC) channel that carries the respective traffic.

4. The apparatus of claim 2, wherein the first QoS information is specified at a same level of granularity as the second QoS information.

5. The apparatus of claim 2, wherein the first QoS information is specified at a different level of granularity from the second QoS information.

6. The apparatus of claim 1, wherein the first IAB node is associated with the second IAB-donor-CU via a radio resource control (RRC) connection or an F1 control plane (F1-C) connection, the second IAB node and the third IAB node are associated with the first IAB-donor-CU via a respective RRC connection or a respective F1-C connection, and the fourth IAB node is associated with the third IAB-donor-CU via an RRC connection or an F1-C connection.

7. The apparatus of claim 1, wherein the first IAB node is an IAB-donor node.

8. The apparatus of claim 1, wherein the fourth IAB node is an IAB-donor node.

9. The apparatus of claim 1, wherein the second IAB node and the third IAB node are a same node.

10. The apparatus of claim 1, wherein each of the first traffic and the second traffic comprises one of: an uplink traffic, a downlink traffic, or a bidirectional traffic.

11. The apparatus of claim 1, the at least one processor being further configured to:
receive internet protocol (IP) address information from the third IAB-donor-CU; and
forward the IP address information to the second IAB-donor-CU, wherein the first traffic is routed based at least in part on the IP address information.

12. The apparatus of claim 11, wherein the IP address information comprises an IP address or an IP prefix.

13. The apparatus of claim 11, wherein the IP address information is anchored at an IAB donor-distributed unit (IAB-donor-DU) associated with the third IAB-donor-CU.

14. The apparatus of claim 11, further comprising a transceiver coupled to the at least one processor, and the at least one processor being further configured to:
receive a second request for the IP address information from the second IAB-donor-CU; and
forward the second request for the IP address information to the third IAB-donor-CU, wherein the receiving and the forwarding of the IP address information are based on the second request for the IP address information.

15. A method for wireless communication at a first integrated access and backhaul (IAB) donor central unit (IAB-donor-CU), comprising:
receiving a first request from a second IAB-donor-CU to route a first traffic between a first IAB node associated with the second IAB-donor-CU and a second IAB node associated with the first IAB-donor-CU;
receiving, from the second IAB-donor-CU, first quality of service (QoS) information for the first traffic; and
transmitting a request to a third IAB-donor-CU to route a second traffic between a third IAB node associated with the first IAB-donor-CU and a fourth IAB node associated with the third IAB-donor-CU, wherein at least a part of content of the second traffic is based on the first traffic.

16. An apparatus of wireless communication at a second integrated access and backhaul (IAB) donor central unit (IAB-donor-CU), comprising:
a memory; and
at least one processor coupled to the memory and configured to:
transmit a first request to a first IAB-donor-CU to route a first traffic between a first IAB node associated with the second IAB-donor-CU and a second IAB node associated with the first IAB-donor-CU, wherein the first request relates to routing second traffic between a third IAB node associated with the first IAB-donor-CU and a fourth IAB node associated with a third IAB-donor-CU, and content of the second traffic is at least partially based on the first traffic;
transmit, to the first IAB-donor-CU, first quality of service (QoS) information for the first traffic, wherein second QoS information for the second traffic is based at least in part on the first QoS information; and
receive, from the first IAB-donor-CU, an indication that at least part of the first traffic is rerouted via an IAB node associated with the third IAB-donor-CU.

17. The apparatus of claim 16, wherein each of the first QoS information and the second QoS information is associated with at least one of:
a radio bearer of respective traffic;
an F1 user plane (F1-U) tunnel of the respective traffic;
a QoS flow of the respective traffic; or
a backhaul radio link control (RLC) channel that carries the respective traffic.

18. The apparatus of claim 16, wherein the first QoS information is specified at a same level of granularity as the second QoS information.

19. The apparatus of claim 16, wherein the first QoS information is specified at a different level of granularity from the second QoS information.

20. The apparatus of claim 16, wherein the first IAB node is associated with the second IAB-donor-CU via a radio resource control (RRC) connection or an F1 control plane (F1-C) connection, the second IAB node and the third IAB node are associated with the first IAB-donor-CU via a respective RRC connection or a respective F1-C connection, and the fourth IAB node is associated with the third IAB-donor-CU via an RRC connection or an F1-C connection.

21. The apparatus of claim 16, wherein the first IAB node is an IAB-donor node.

22. The apparatus of claim 16, wherein the fourth IAB node is an IAB-donor node.

23. The apparatus of claim 16, wherein the second IAB node and the third IAB node are a same node.

24. The apparatus of claim 16, wherein each of the first traffic and the second traffic comprises one of: an uplink traffic, a downlink traffic, or a bidirectional traffic.

25. The apparatus of claim 16, the at least one processor being further configured to:
receive, at the second IAB-donor-CU, internet protocol (IP) address information forwarded from the first IAB-donor-CU, wherein the IP address information is forwarded from the third IAB-donor-CU by the first IAB-donor-CU, and the first traffic is routed based at least in part on the IP address information.

26. The apparatus of claim 25, wherein the IP address information comprises an IP address or an IP prefix.

27. The apparatus of claim 25, wherein the IP address information is anchored at an IAB donor-distributed unit (DU) associated with the third IAB-donor-CU.

28. The apparatus of claim 25, the at least one processor being further configured to:
transmit a second request for the IP address information to the first IAB-donor-CU for forwarding to the third IAB-donor-CU, wherein the IP address information is received based on the second request for the IP address information.

29. The apparatus of claim 28, further comprising a transceiver coupled to the at least one processor, wherein the IP address information or the second request for the IP address information indicates a usage.

30. A method of wireless communication between a first integrated access and backhaul (IAB) donor central unit (IAB-donor-CU) and a second IAB-donor-CU, comprising:
transmitting a first request to the first IAB-donor-CU to route a first traffic between a first IAB node associated with the second IAB-donor-CU and a second IAB node associated with the first IAB-donor-CU, wherein the first request relates to routing second traffic between a third IAB node associated with the first IAB-donor-CU and a fourth IAB node associated with a third IAB-donor-CU, and content of the second traffic is at least partially based on the first traffic;
transmitting, to the first IAB-donor-CU, first quality of service (QoS) information for the first traffic, wherein second QoS information for the second traffic is based at least in part on the first QoS information; and
receiving, from the first IAB-donor-CU, an indication that at least part of the first traffic is rerouted via an IAB node associated with the third IAB-donor-CU.

\* \* \* \* \*